(12) United States Patent
Lee et al.

(10) Patent No.: US 9,515,696 B2
(45) Date of Patent: Dec. 6, 2016

(54) METHOD FOR HALF-DUPLEX FDD OPERATION IN LTE FDD NETWORK

(71) Applicant: InterDigital Patent Holdings, Inc., Wilmington, DE (US)

(72) Inventors: Moon-il Lee, Farmingdale, NY (US); Allan Y. Tsai, Boonton, NJ (US); Pouriya Sadeghi, Verdun (CA); Fengjun Xi, Huntington Station, NY (US); Marian Rudolf, Montreal (CA); Janet A. Stern-Berkowitz, Little Neck, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 254 days.

(21) Appl. No.: 13/836,812

(22) Filed: Mar. 15, 2013

(65) Prior Publication Data

US 2013/0242824 A1    Sep. 19, 2013

Related U.S. Application Data

(60) Provisional application No. 61/612,057, filed on Mar. 16, 2012, provisional application No. 61/644,903, filed on May 9, 2012.

(51) Int. Cl.
*H04J 1/00* (2006.01)
*H04B 1/50* (2006.01)
*H04L 5/16* (2006.01)
(Continued)

(52) U.S. Cl.
CPC ............. *H04B 1/50* (2013.01); *H04L 1/1819* (2013.01); *H04L 1/1822* (2013.01); *H04L 5/0053* (2013.01); *H04L 5/16* (2013.01); *H04L 1/1893* (2013.01); *H04L 5/0023* (2013.01);

(Continued)

(58) Field of Classification Search
CPC ............ H04B 1/50; H04B 1/52; H04B 1/54; H04B 1/56
USPC .................... 370/281, 295, 343, 480
See application file for complete search history.

(56) References Cited

U.S. PATENT DOCUMENTS

| | | | |
|---|---|---|---|
| 2011/0013613 A1* | 1/2011 | Sung et al. | 370/338 |
| 2011/0059745 A1* | 3/2011 | Yi et al. | 455/452.2 |
| 2012/0094664 A1* | 4/2012 | Jung et al. | 455/434 |

FOREIGN PATENT DOCUMENTS

| | | |
|---|---|---|
| EP | 2 280 576 | 2/2011 |
| WO | 2010/037013 | 4/2010 |

OTHER PUBLICATIONS

Half Duplex FDD Operation in LTE, 3GPP, TSG-RAN WG1 Meeting #51bis.*

(Continued)

*Primary Examiner* — Ricky Ngo
*Assistant Examiner* — Wei-Po Kao
(74) *Attorney, Agent, or Firm* — Julian F. Santos

(57) ABSTRACT

A method and apparatus for half-duplex (HD) frequency division duplex (FDD) (HD-FDD) operation are disclosed. The method in a wireless transmit/receive unit (WTRU) includes monitoring a first frequency for all downlink sub-frames for downlink communication except during a cell specific uplink frame, retuning to a second frequency and transmitting a scheduling request (SR) during a WTRU specific period of the cell specific uplink frame, wherein the WTRU specific period is based on a duty cycle, and retuning to the first frequency and receiving an uplink grant in a subsequent sub-frame.

17 Claims, 24 Drawing Sheets

(51) Int. Cl.
H04L 1/18 (2006.01)
H04L 5/00 (2006.01)

(52) U.S. Cl.
CPC .......... *H04L 5/0048* (2013.01); *H04L 5/0055* (2013.01); *H04L 5/0091* (2013.01)

(56) References Cited

OTHER PUBLICATIONS

Third Generation Partnership Project, "Technical Specification Group Radio Access Network; Evolved Universal Terrestrial Radio Access (E-UTRA); Physical Channels and Modulation (Release 8)," 3GPP TS 36.211 V8.9.0 (Dec. 2009).
Third Generation Partnership Project, "Technical Specification Group Radio Access Network; Evolved Universal Terrestrial Radio Access (E-UTRA); Physical Channels and Modulation (Release 9)," 3GPP TS 36.211 V9.1.0 (Mar. 2010).
Third Generation Partnership Project, "Technical Specification Group Radio Access Network; Evolved Universal Terrestrial Radio Access (E-UTRA); Physical Channels and Modulation (Release 10)," 3GPP TS 36.211 V10.4.0 (Dec. 2011).
Third Generation Partnership Project, "Technical Specification Group Radio Access Network; Evolved Universal Terrestrial Radio Access (E-UTRA); Physical Channels and Modulation (Release 10)," 3GPP TS 36.211 V10.7.0 (Feb. 2013).
Third Generation Partnership Project, "Technical Specification Group Radio Access Network; Evolved Universal Terrestrial Radio Access (E-UTRA); Physical Channels and Modulation (Release 11," 3GPP TS 36.211 V11.2.0 (Feb. 2013).
Third Generation Partnership Project, "Technical Specification Group Radio Access Network; Evolved Universal Terrestrial Radio Access (E-UTRA); Multiplexing and channel coding (Release 8)," 3GPP TS 36.212 V8.8.0 (Dec. 2009).
Third Generation Partnership Project, "Technical Specification Group Radio Access Network; Evolved Universal Terrestrial Radio Access (E-UTRA); Multiplexing and channel coding (Release 9)," 3GPP TS 36.212 V9.4.0 (Sep. 2011).
Third Generation Partnership Project, "Technical Specification Group Radio Access Network; Evolved Universal Terrestrial Radio Access (E-UTRA); Multiplexing and channel coding (Release 10)," 3GPP TS 36.212 V10.5.0 (Mar. 2012).
Third Generation Partnership Project, "Technical Specification Group Radio Access Network; Evolved Universal Terrestrial Radio Access (E-UTRA); Multiplexing and channel coding (Release 10)," 3GPP TS 36.212 V10.7.0 (Dec. 2012).
Third Generation Partnership Project, "Technical Specification Group Radio Access Network; Evolved Universal Terrestrial Radio Access (E-UTRA); Multiplexing and channel coding (Release 11)," 3GPP TS 36.212 V11.2.0 (Feb. 2013).
Third Generation Partnership Project, "Technical Specification Group Radio Access Network; Evolved Universal Terrestrial Radio Access (E-UTRA); Physical layer procedures (Release 8)," 3GPP TS 36.213 V8.8.0 (Sep. 2009).
Third Generation Partnership Project, "Technical Specification Group Radio Access Network; Evolved Universal Terrestrial Radio Access (E-UTRA); Physical layer procedures (Release 9)," 3GPP TS 36.213 V9.3.0 (Sep. 2010).
Third Generation Partnership Project, "Technical Specification Group Radio Access Network; Evolved Universal Terrestrial Radio Access (E-UTRA); Physical layer procedures (Release 10)," 3GPP TS 36.213 V10.5.0 (Mar. 2012).
Third Generation Partnership Project, "Technical Specification Group Radio Access Network; Evolved Universal Terrestrial Radio Access (E-UTRA); Physical layer procedures (Release 10)," 3GPP TS 36.213 V10.9.0 (Feb. 2013).
Third Generation Partnership Project, "Technical Specification Group Radio Access Network; Evolved Universal Terrestrial Radio Access (E-UTRA); Physical layer procedures (Release 11)," 3GPP TS 36.213 V11.2.0 (Feb. 2013).
Nokia Corporation et al., "Support of Half Duplex UEs in MAC," 3GPP TSG-RAN WG2 Meeting #62, R2-082200, Kansas City, USA (May 5-9, 2008).
Nortel, "Analysis of HD-FDD error and TX/RX conflict scenarios," 3GPP TSG RAN WG2 #62, R2-082244, Kansas City, USA (May 5-9, 2008).
"3rd Generation Partnership Project Technical Specification; LTE; Evolved Universal Terrestrial Radio Access (E-UTRA); Multiplexing and Channel Coding (Release 10)", 3GPP TS 36.212 V10.1.0, Apr. 2011, 76 pages.
"3rd Generation Partnership Project Technical Specification; LTE; Evolved Universal Terrestrial Radio Access (E-UTRA); Physical Layer Procedures (Release 10)", 3GPP TS 36.211 V10.1.0, Apr. 2011, 103 pages.
"3rd Generation Partnership Project Technical Specification; LTE; Evolved Universal Terrestrial Radio Access (E-UTRA); Physical Layer Procedures (Release 10)", 3GPP TS 36.213 V10.1.0, Apr. 2011, 115 pages.

* cited by examiner

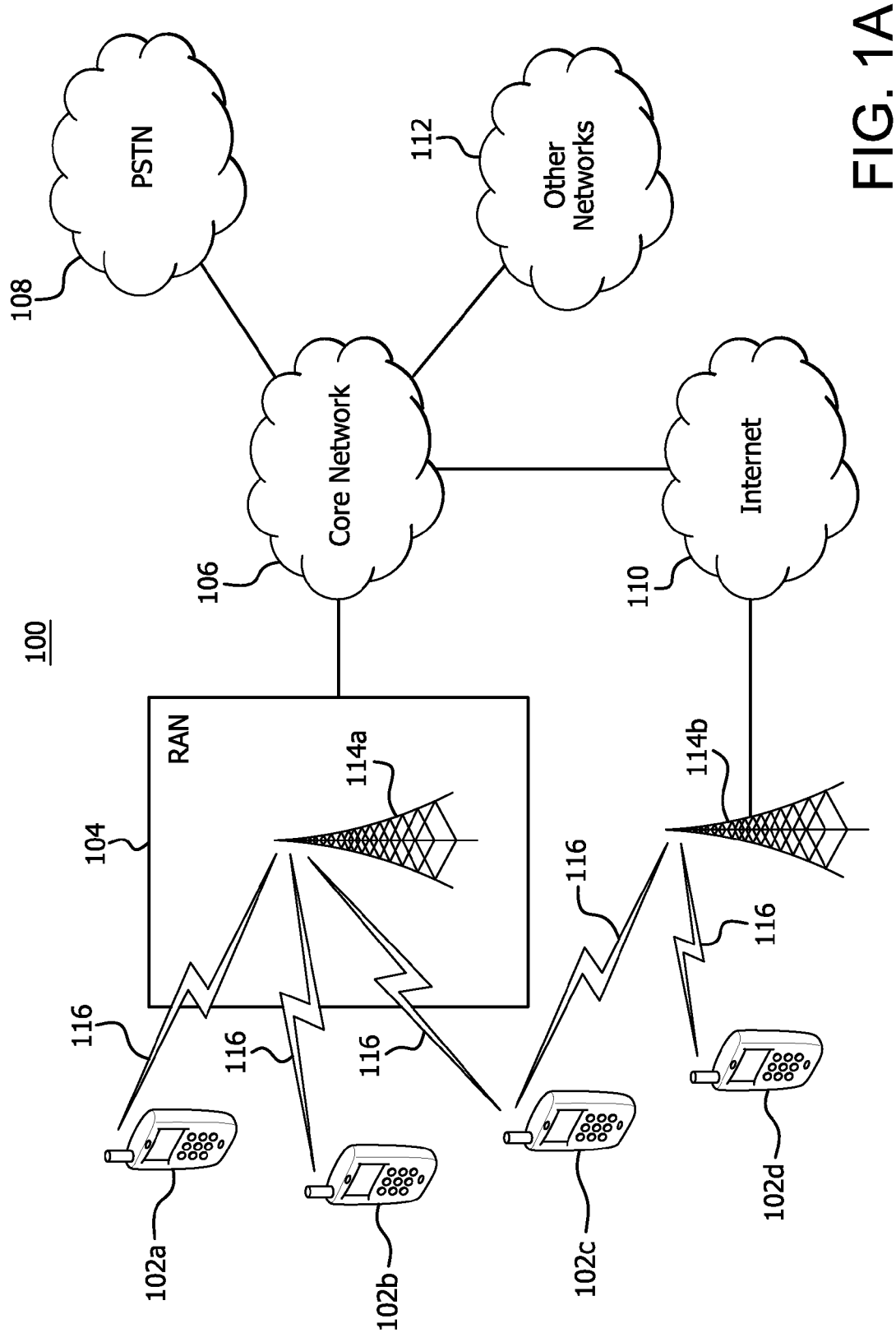

METHOD FOR HALF-DUPLEX FDD OPERATION IN LTE FDD NETWORK

CROSS REFERENCE TO RELATED APPLICATIONS

This application claims the benefit of U.S. Provisional Application No. 61/612,057 filed Mar. 16, 2012 and U.S. Provisional Application No. 61/644,903 filed May 9, 2012, the contents of which are hereby incorporated by reference herein.

BACKGROUND

Current long term evolution (LTE)/LTE-A frequency division duplex (FDD) networks may be unable to support half-duplex (HD)-FDD wireless transmit/receive unit (WTRU) if the HD-FDD WTRU simply follows regular FDD WTRUs. The LTE/LTE-A may support both FDD and time division duplex (TDD) together. TDD operation may be similar to half-duplex FDD, such that a WTRU may perform either uplink transmission or downlink reception at one time. Because a TDD uplink (UL)/downlink (DL) subframe configuration is reused for HD-FDD WTRU in FDD network and all TDD-specific functions are supported, the scheduling flexibility may still be restricted, as few subframe configurations were defined in TDD. Similar to FD-FDD, HD-FDD may use at least two separate frequency bands for UL and DL transmissions, but UL and DL transmissions may not be supported simultaneously. In other words, HD-FDD may suffer from spectral inefficiency due to incomplete frequency band usage. Meanwhile, HD-FDD operation may be scheduled in the same manner as a TDD system, and may operate asymmetric DL-UL or UL-DL data requirements in a manner similar to TDD networks. Furthermore, in either DL or UL transmission, there may be a need for corresponding acknowledgement/non-acknowledgement (A/N) feedback.

In FD-FDD, in order to minimize the control signaling overhead, UL hybrid automatic repeat request (HARQ) may be synchronized so that UL retransmission occurs 8 subframes after the previous transmission of the same HARQ process, which may not give the UL scheduling flexibility to the WTRU. In HD-FDD, DL and UL transmission may be scheduled by eNB to avoid the conflict transmission. However, for some situations, there may be no available or scheduled source for a scheduling request (SR) or for when the WTRU has a SR to be transmitted but may be preempted by DL data reception.

SUMMARY

A method and apparatus for half-duplex (HD) frequency division duplex (FDD) (HD-FDD) operation are disclosed. The method in a wireless transmit/receive unit (WTRU) includes monitoring a first frequency for all downlink subframes for downlink communication except during a cell specific uplink frame, retuning to a second frequency and transmitting a scheduling request (SR) during a WTRU specific period of the cell specific uplink frame, wherein the WTRU specific period is based on a duty cycle, and retuning to the first frequency and receiving an uplink grant in a subsequent sub-frame.

BRIEF DESCRIPTION OF THE DRAWINGS

A more detailed understanding may be had from the following description, given by way of example in conjunction with the accompanying drawings wherein:

FIG. 1A is a system diagram of an example communications system in which one or more disclosed embodiments may be implemented;

DETAILED DESCRIPTION

Figure 1B:
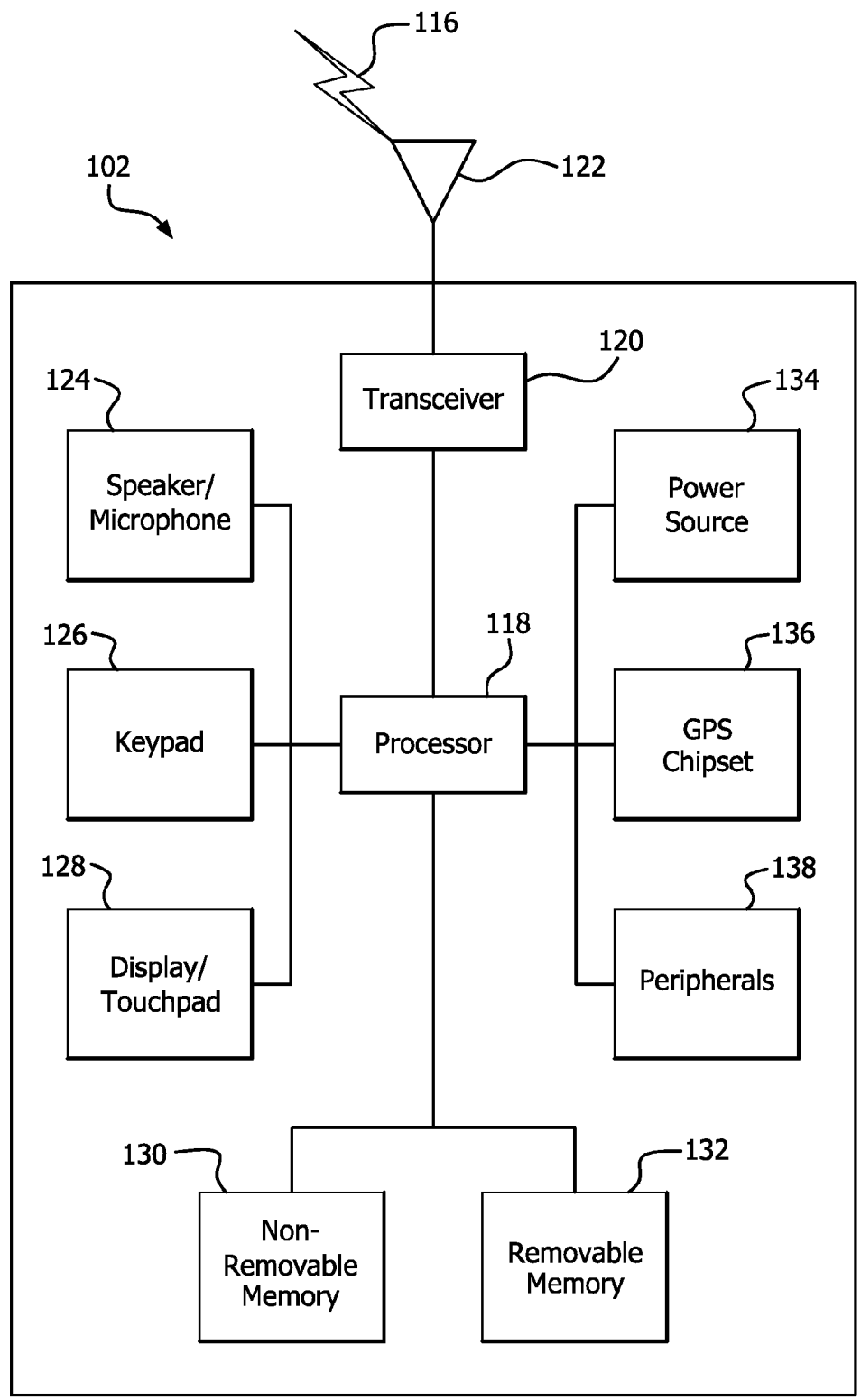
FIG. 1B is a system diagram of an example wireless transmit/receive unit (WTRU) that may be used within the communications system illustrated in FIG. 1A.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals.

In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
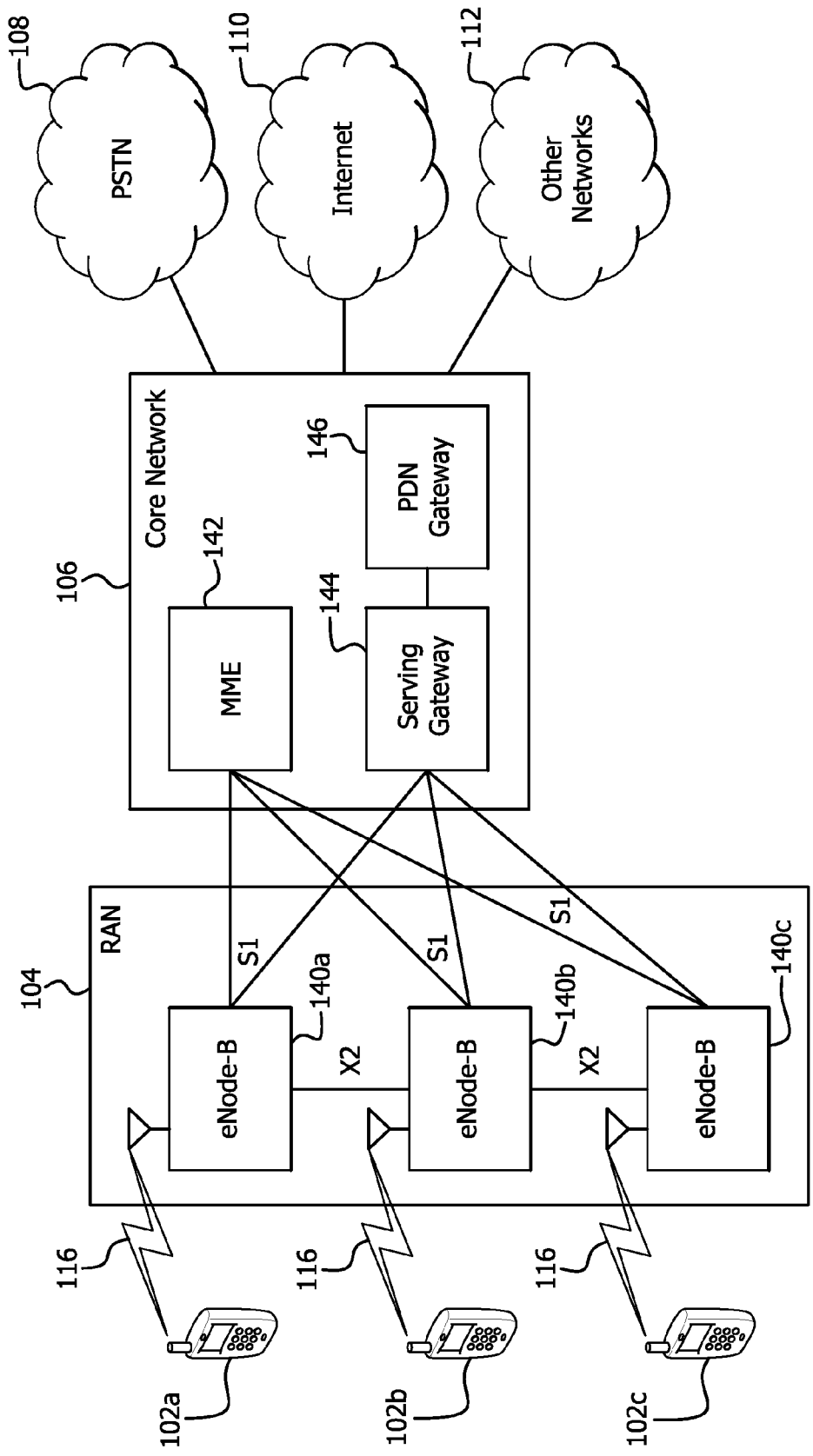
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the UL and/or DL, and the like. As shown in FIG. 1C, the eNode-Bs 140a, 140b, 140c may communicate with one another over an X2 interface.

The core network 106 shown in FIG. 1C may include a mobility management entity (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode-Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode-B handovers, triggering paging when DL data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

A half-duplex (HD) frequency division duplex (FDD) WTRU class may be defined in an FDD network and may be implemented with a cheaper price since the duplexer may be replaced by a switch. This type of WTRU may be attractive as a low cost WTRU supporting low data rate and/or voice traffic. This newly defined HD-FDD WTRU class may be compatible with an FDD network and may coexist with regular FDD WTRUs.

In a Long Term Evolution (LTE) and a LTE-Advanced FDD network, an HD-FDD WTRU may lose some portion of a downlink (DL) subframe while transmitting uplink (UL) signals such as a Physical Uplink Shared Channel (PUSCH), a Physical Uplink Control Channel (PUCCH), and a Sounding Reference Signal (SRS). Regular FDD WTRU behavior may be reused for this HD-FDD WTRU.

Current LTE/LTE-A FDD networks may be unable to support an HD-FDD WTRU if the HD-FDD WTRU follows regular FDD WTRUs. The LTE/LTE-A may support both frequency division duplex (FDD) and time division duplex (TDD) together. TDD operation may be similar to half-duplex FDD, such that a WTRU may perform either UL transmission or DL reception at a time. Therefore, TDD UL/DL subframe configuration may be reused for HD-FDD WTRUs and the HD-FDD WTRUs may follow TDD WTRU behavior. However, TDD-specific functions may be redesigned for an FDD network in order for HD-FDD WTRUs to mimic TDD WTRU behavior. Therefore, TDD-specific functions may be redesigned in an FDD network.

Although TDD UL/DL subframe configuration may be reused for an HD-FDD WTRU in an FDD network and all TDD-specific functions are supported, the scheduling flexibility may still be restricted as few subframe configurations were defined in TDD. Hence, current TDD UL/DL subframe configuration may not be appropriate as it reduces scheduling flexibility.

Similar to Full Duplex (FD)-FDD, HD-FDD may use at least two separate frequency bands for UL and DL transmissions, but UL and DL transmissions may not be supported simultaneously. In other words, HD-FDD may suffer from spectral inefficiency due to incomplete frequency band usage. Meanwhile, HD-FDD operation may be scheduled in the same manner as a TDD system, and may operate asymmetric DL-UL or UL-DL data requirements in a manner similar to TDD networks. Furthermore, for either DL or UL transmission, there may be a need for corresponding Acknowledgment (ACK)/Non-Acknowledgement (NACK) (A/N) feedback. However, due to the non-overlap time transmission and reception properties of an HD-FDD system, a DL or UL A/N may be required to transmit at different scheduled times, thus the timing of synchronous HARQ may not be used in an HD-FDD system. Also, DL or UL A/N may take too much transmission overhead for HD-FDD operation since HD-FDD may not receive and transmit at the same time.

Figure 2:
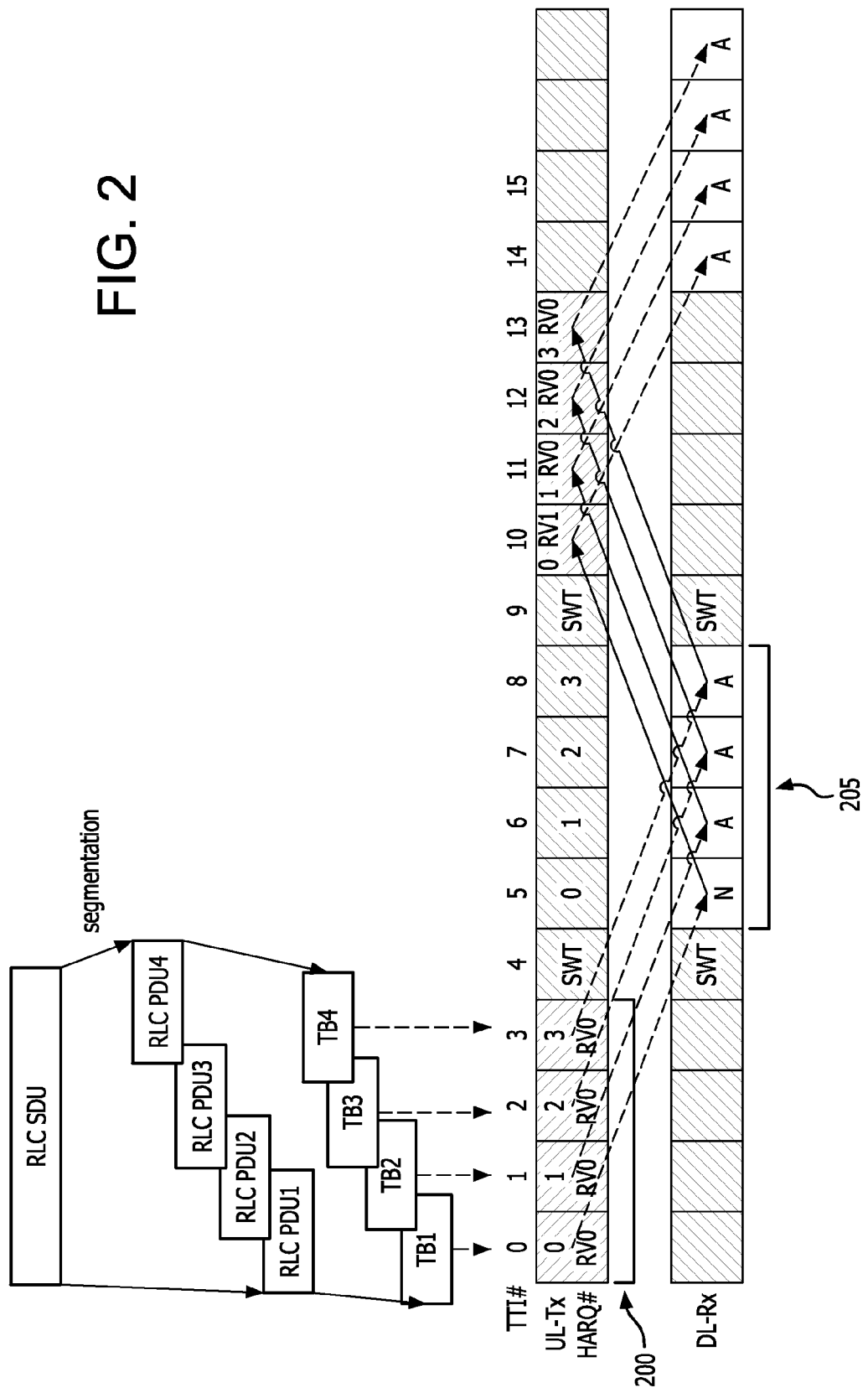
FIG. 2 is an example of a wireless transmit/receive unit (WTRU)-specific precoded DM-RS.

FIG. 2 is an example of HD-FDD HARQ processes and A/N timing. In FIG. 2, an UL transmission scheme is set up with HARQ processes equal to 4 200. In FIG. 2, 4 UL A/Ns 200 corresponding to HARQ processes are required. Therefore, at least 4 subframes 205 may be used in the DL for UL A/N transmission. To maintain the A/N timing, for example, n+4 A/N timing similar to FD-FDD in LTE-R8, it may impose very stringent timing conditions for HD-FDD operation and hamper the scheduler for the DL and UL allocation radio.

In FD-FDD, in order to minimize the control signaling overhead, UL HARQ may be synchronized so that UL retransmission occurs 8 subframes after the previous transmission of the same HARQ process, which may not give the UL scheduling flexibility to the WTRU. In HD-FDD, the dynamic or different DL/UL subframe configuration may be introduced, which may bring additional hurdles for HARQ transmission. These hurdles may include UL retransmissions that may occur at any time after the initial transmission depending on the availability of UL subframe, which may result in asynchronous UL HARQ. Therefore, an explicit HARQ process number may be needed to indicate which HARQ process is being addressed. For an FD-FDD WTRU, the timing between reception of an UL scheduling grant on a Physical Downlink Control Channel (PDCCH) and the corresponding transmission on the UL-Shared Channel (SCH) may be fixed such that an UL grant received in DL subframe n applies to UL subframe (n+4). For an HD-FDD WTRU, this timing relation may not be possible as subframe (n+4) may not be an UL subframe due to dynamic or different DL/UL subframe configuration.

The timing between reception of an UL NACK acknowledgement on a Physical Hybrid-ARQ Indicator Channel (PHICH) and the corresponding retransmission on the UL-SCH may be fixed such that an UL NACK received in DL subframe n applies to UL subframe (n+4) for an FD-FDD WTRU. This timing may not be possible for an HD-FDD WTRU as subframe (n+4) may not be an UL subframe due to dynamic or different DL/UL subframe configuration.

UL scheduling grants may use DCI format 0, where there is no explicit signaling of the redundancy version in the ULs scheduling grants due to the use of a synchronous HARQ protocol in the UL. In HD-FDD, DL and UL transmission may be scheduled by an eNB to avoid the conflict transmission. However, in some situations, there may be no available or scheduled source for a scheduling request (SR) or for when the WTRU has a SR to be transmitted but is preempted by DL data reception. Uplink SR resources may be configured by higher layer with some specific duty cycle. Therefore, an FDD WTRU may transmit a SR in a configured SR resource if any data occurs in the buffer. However, if the subframe for the SR is configured for DL transmission for a HD-FDD WTRU, the WTRU may not be able to transmit the SR. Therefore, a specific WTRU behavior or SR procedure may be defined to handle that situation. Method to address HD-FDD terminal behavior when a WTRU is in DL reception, but requires sending UL data and/or SR when there is no available periodic SR resource may be needed.

In HD-FDD, a WTRU may use only a portion of all subframes for UL. Due to the limited WTRU transmit power, such reduction in the available UL subframes may translate into lower UL coverage. For example, if the DL:UL share is 3:2, then the WTRU transmission power density may be reduced by $10 \times \log 10(2/5) = -4$ dB as 2.5 (i.e., 5/2) times the bandwidth needed for the UL transmission. From another point of view, at a fixed distance from the base station, the maximum achievable HD-FDD bit rate may be roughly 2.5 times lower than the bit rate of the FD-FDD. This phenomenon may be similar to that experienced for TDD operation compared to the FDD mode. One option to improve the UL coverage for HD-FDD may be to use a Transmission Time Interval (TTI) bundling mechanism. The application of TTI bundling to HD-FDD, where only a limited number of subframes are available as UL subframes, is described herein.

Multiple antenna transmission may be introduced in an LTE/LTE-A system for various purposes including peak system throughput enhancement, extend cell coverage, and high Doppler supports. The single-user multiple-input and multiple output (MIMO) may increase a peak/average WTRU throughput while multi-user MIMO may improve a peak/average system throughput by exploiting multi-user diversity gain. Table 1 is an example of MIMO capabilities in an LTE/LTE-Advanced system.

TABLE 1

| | | 3GPP E-UTRA | | |
|---|---|---|---|---|
| Key Downlink MIMO Techniques | | LTE Release 8 | Release 9 | LTE-Advanced Release 10 |
| DL | SU-MIMO | Up to 4 streams | Up to 4 streams | Up to 8 streams |
| | MU-MIMO | Up to 2 users (unitary precoding) | Up to 4 users (non-unitary precoding) | Up to 4 users (non-unitary precoding) |
| UL | SU-MIMO | 1 stream | 1 stream | Up to 4 streams |
| | MU-MIMO | Up to 8 users | Up to 8 users | Up to 8 users |

In order to optimize the MIMO performance according to the WTRU channel environments, up to 9 transmission modes may be employed including transmit diversity mode, open-loop spatial multiplexing mode, and closed-loop spatial multiplexing mode. For MIMO link adaptation, a WTRU may report channel-state information (CSI) of multiple transmit antenna ports.

The reference signal may be classified to a WTRU-specific reference signal (WTRU-RS) and a cell-specific reference signal (CRS). The WTRU-RS may be used only for a specific WTRU so that the RS is transmitted for the resources allocated to the WTRU. On the other hand, the CRS may be shared by all WTRUs in the cell so that the RS is transmitted in a wideband manner. In addition, according to the usage of the reference signal, it may be further differentiated to a demodulation reference signal (DM-RS) and channel-state-information reference signal (CSI-RS).

The DM-RS may only be used for a specific WTRU and the RS may typically be precoded to exploit beamforming gain. Since the WTRU-specific DM-RS is not shared with other WTRUs in the cell, the DM-RS may be transmitted in the time/frequency resources allocated for the WTRU. The DM-RS may only be used for demodulation purpose.

Figure 3:
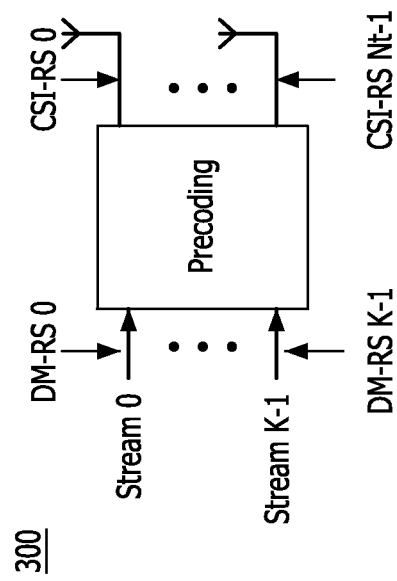
FIG. 3 is an example of a non-precoded cell-specific reference signal (RS)

FIG. 3 is an example of a WTRU-specific precoded DM-RS. FIG. 3 illustrates that if a precoded DM-RS 300 is employed, the RS may be precoded with the same precoding used for data symbol and the same number of RS sequences corresponding to the number of layers K is transmitted. Here, K is equal to or smaller than the number of physical antenna ports NT. As shown in FIG. 3, the K streams may be allocated for a WTRU or shared with multiple WTRUs. If multiple WTRUs share the K streams, the co-scheduled WTRUs may share the same time/frequency resources at the same time.

The CRS may be defined for all WTRUs in a cell and may be used for demodulation and measurement purposes. Since the CRS is shared by all WTRUs, a non-precoded RS may typically be employed in order to keep uniform cell coverage. The precoded RS may have different cell coverage according to the directions due to the beamforming effect.

Figure 4:
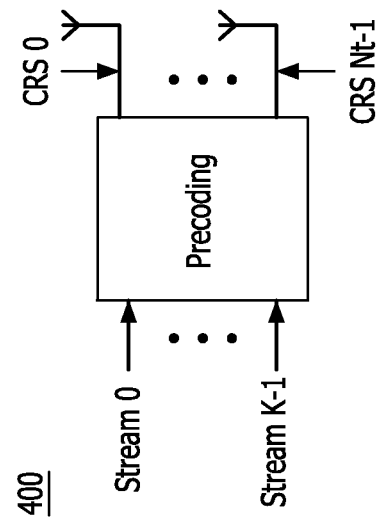
FIG. 4 is an example of a WTRU-specific DM-RS for normal CP.

FIG. 4 is an example of a non-precoded cell-specific RS. FIG. 4 illustrates an example of a MIMO transmitter for non-precoded CRS transmissions 400. In some cases, antenna virtualization may be used if the number of physical antenna ports and logical antenna ports are different. The RS sequences may be transmitted for all antenna ports irrespective of the number of streams.

Figure 5:
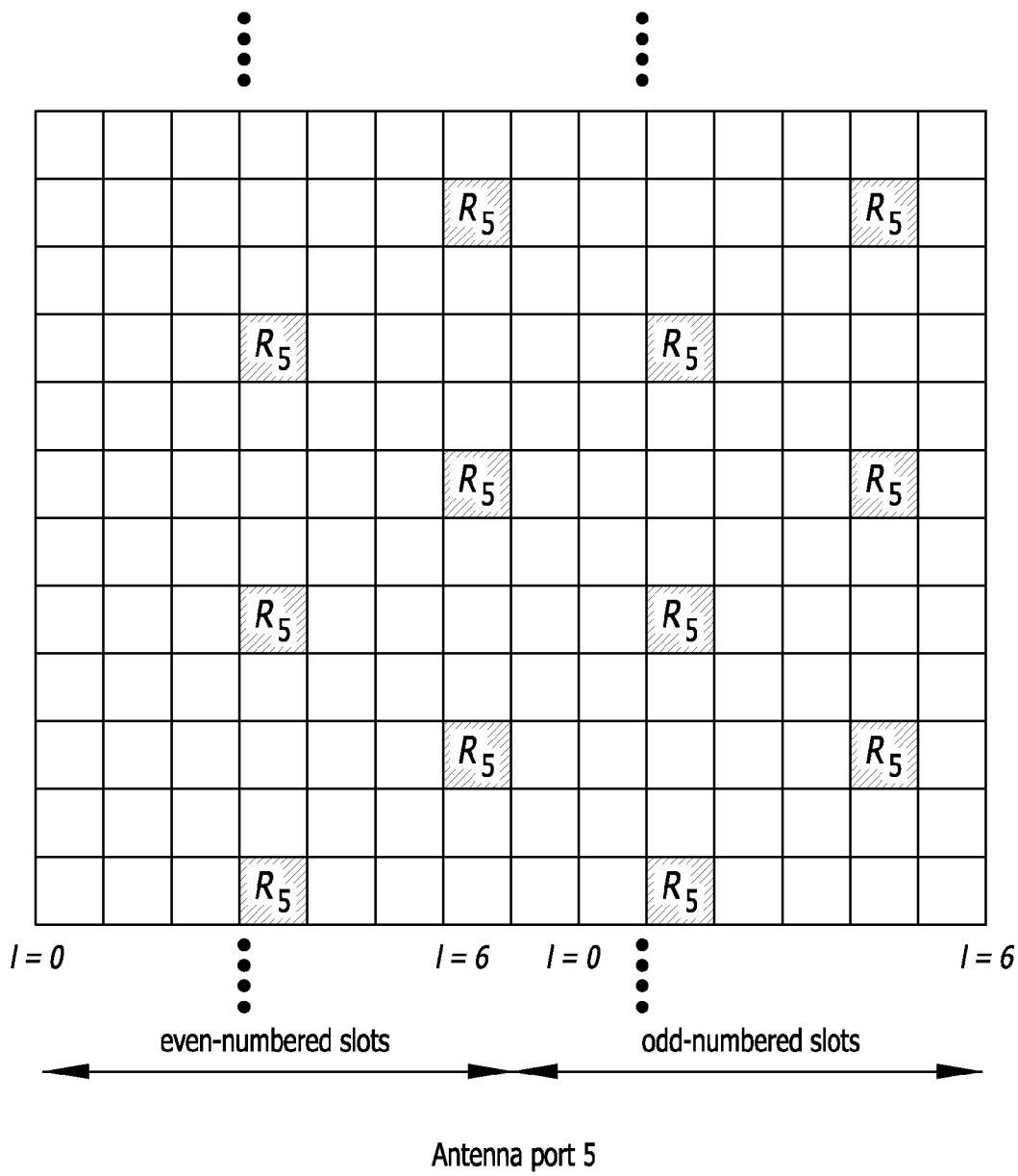
FIG. 5 is an example of a cell-specific reference signaling (CRS) structure according to the number of antenna ports.

FIG. 5 is an example of a WTRU-specific DM-RS for a normal CP. FIG. 5 illustrates a DM-RS, for example, antenna port-5 500, defined in an LTE system to support non-codebook based transmission at an eNB. The antenna port-5 500 may only support one layer transmission. Since antenna port-5 500 is always transmitted with CRS, the total RS overhead may increase significantly.

Figure 6:
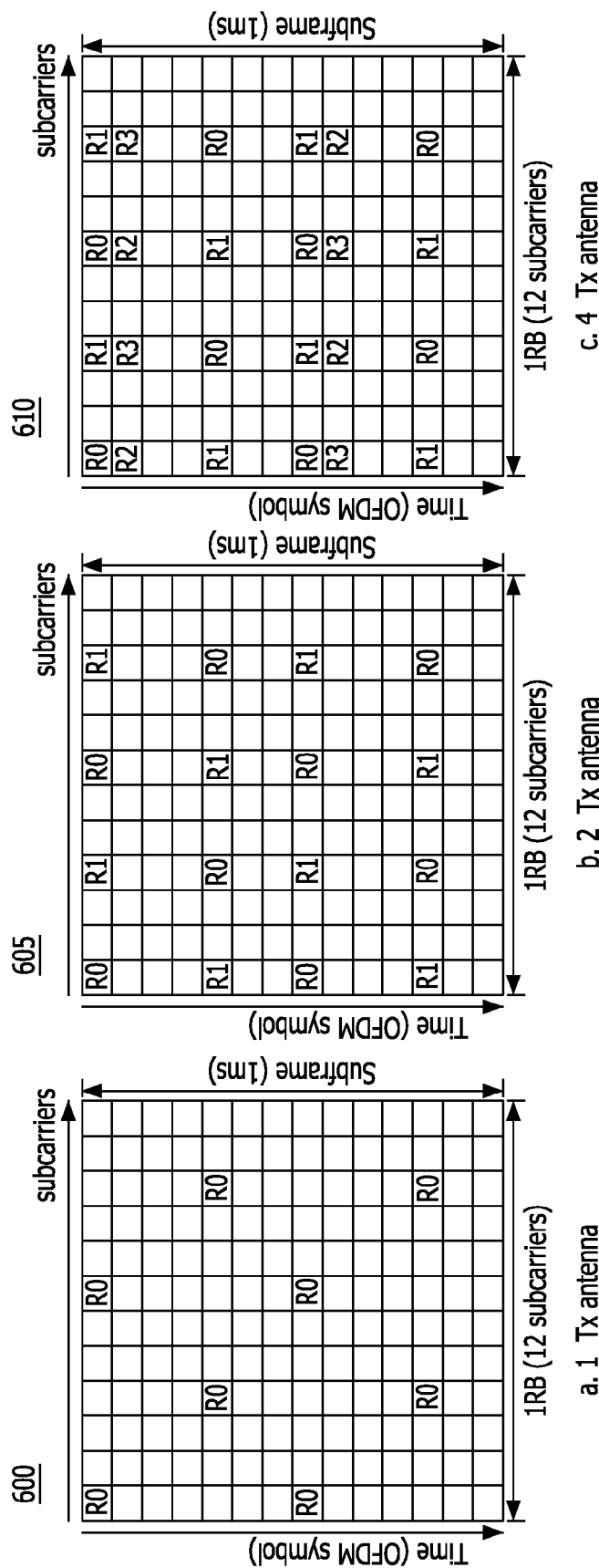
FIG. 6 is an example of a DM-RS pattern supporting up to 8 layers.

FIG. 6 is an example of a CRS structure according to the number of antenna ports. The CRS patterns 600, 605, and 610 for each antenna port may be mutually orthogonal in time/frequency domain. In FIG. 6, R0 and R1 indicate CRS for antenna port 0 and antenna port 1, respectively. In order to avoid interference between CRS antenna ports, the data resource elements (REs) may be located at a RE in which any transmitted CRS antenna ports are muted.

A predefined sequence, for example, Pseudo-random (PN), m-sequence, and the like, may be multiplied with DL RS so as to minimize inter-cell interference, thus improving channel estimation accuracy from CRS. Such a PN sequence may be applied in an orthogonal frequency-division multiplexing (OFDM) symbol level in a subframe and the sequence may be defined according to the cell-ID, subframe number, and the position of the OFDM symbol. For example, the number of CRS antenna ports may be two in an OFDM symbol containing CRS per physical resource block (PRB) and the number of PRBs in LTE system may vary from 6 to 110. In this case, the total number of CRS for an antenna port in an OFDM symbol containing RS may be 2×NRB. This may imply that the sequence length may be 2×NRB. Here, NRB may denote the number of RBs corresponding to a bandwidth and the sequence may be binary or complex. The sequence r(m) may show the complex sequence, as illustrated in Equation 1.

$$r(m) = \frac{1}{\sqrt{2}}(1 - 2 \cdot c(2m)) + j\frac{1}{\sqrt{2}}(1 - 2 \cdot c(2m+1)),$$
$$m = 0, 1, \ldots, 2N_{RB}^{max} - 1$$

Equation (1)

where $N_{RB}^{max}$ denotes the number of RBs corresponding to the maximum bandwidth in the LTE system, thus $N_{RB}^{max}$ may be 110 as described above. The c denotes PN sequence with length–31 and may be defined with Gold-sequence. If a DM-RS is configured, Equation 2 may be used.

$$r(m) = \frac{1}{\sqrt{2}}(1 - 2 \cdot c(2m)) + j\frac{1}{\sqrt{2}}(1 - 2 \cdot c(2m+1)),$$
$$m = 0, 1, \ldots, 2N_{RB}^{PDSCH} - 1$$

Equation (2)

where $N_{RB}^{PDSCH}$ denotes the number of RBs allocated for a specific WTRU, thus the sequence length may vary according to the number of RBs allocated for a WTRU.

In order to reduce the overall RS overhead, a DM-RS based DL transmission may be utilized. Since the CRS-based DL transmission may need to transmit RS sequences for all physical antenna ports, the DM-RS based DL transmission may reduce the RS overhead. The DM-RS based transmission may consider that the same number of RSs may be needed for DM-RS as the number of layers. The number of layers may be equal to or smaller than the number of physical antenna ports.

Figure 7:
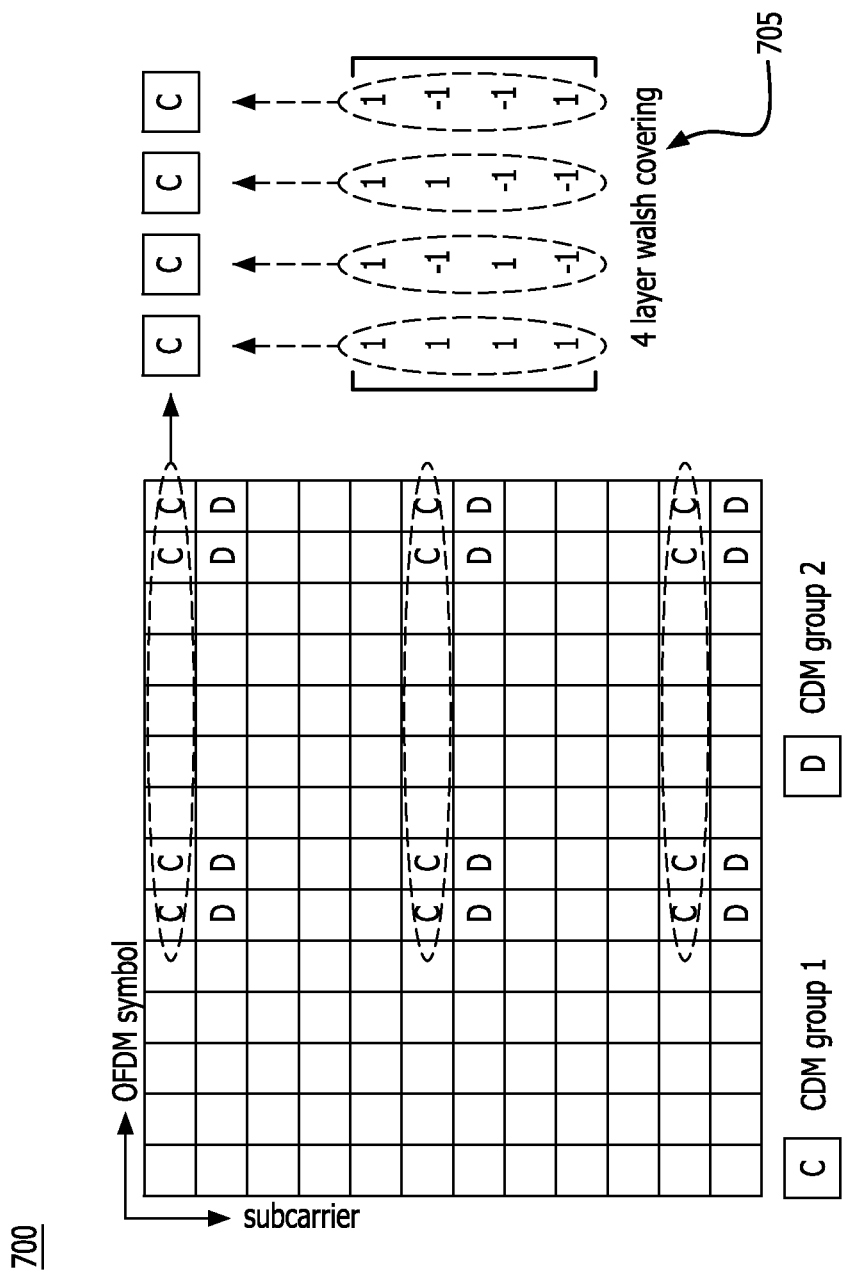
FIG. 7 is an example of a channel state information reference signal (CSI-RS) patterns reuse according to the number of ports.

FIG. 7 is an example of a DM-RS pattern supporting up to 8 layers. FIG. 7 illustrates the DM-RS patterns 700 in a PRB for a regular subframe by way of example. Two Code Division Multiplexing (CDM) groups may be used for multiplexing up to 4 layers in each CDM group; therefore up to 8 layers may be multiplexed as a maximum in this pattern. For the CDM multiplexing of each CDM group, a 4×4 Walsh spreading 705 may be used.

Figure 8:
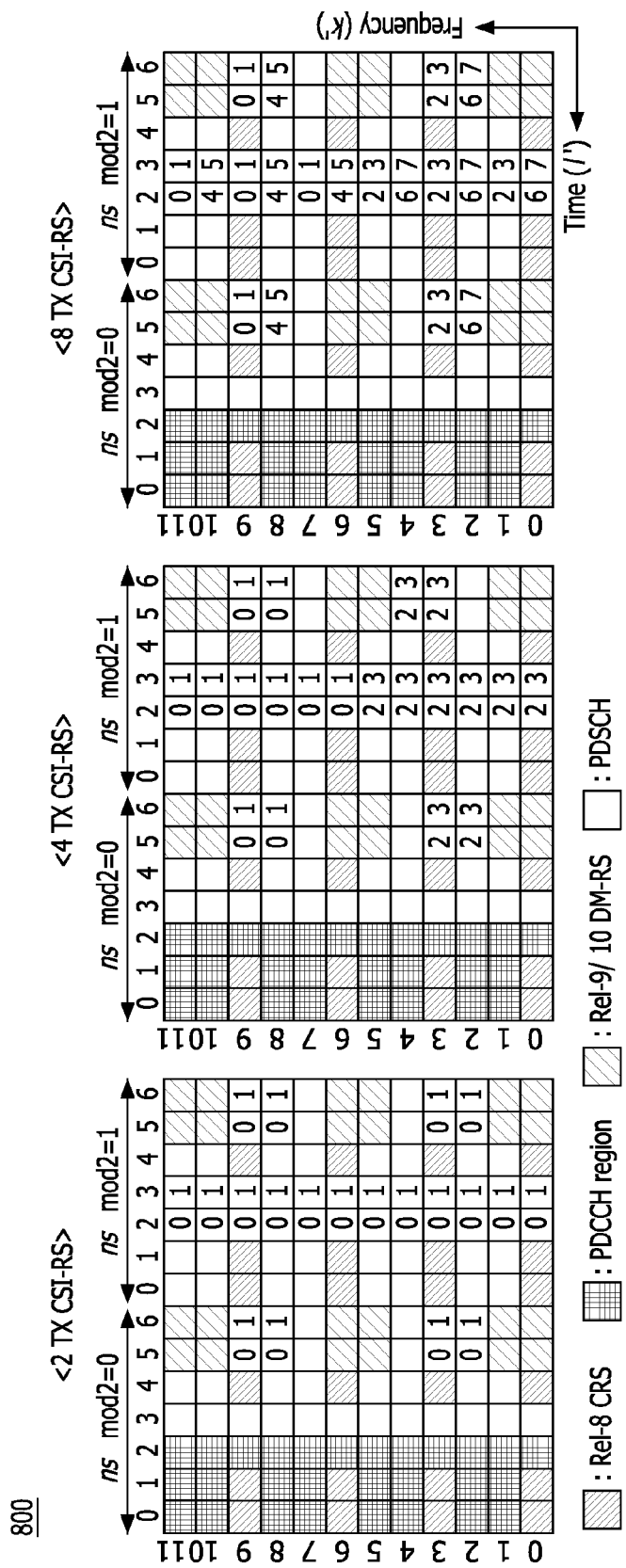
FIG. 8 is an example of a REG definition in downlink control channel region with 2Tx CRS.

FIG. 8 is an example of CSI-RS patterns reuse according to the number of ports. Since the DM-RS is used for demodulation performance, a time/frequency sparse Channel State Information (CSI)-RS 800 may also be introduced for measurement purposes. The CSI-RS may be transmitted with a duty cycle {5, 10, 20, 40, 80} ms in the PDSCH region. In addition, up to 20 CSI-RS patterns reuse may be available in a subframe as shown in FIG. 8.

Table 2 is an example of transmission modes in LTE/LTE-A. All transmission modes except for TM-7, 8, and 9 may use CRS for both demodulation and measurement. For TM-7 and 8, although DM-RS may be used for demodulation, the CRS may still be used for measurement. TM-9 may use DM-RS and CSI-RS for demodulation and measurement, respectively.

TABLE 2

| Transmission mode (TM) | Transmission scheme of PDSCH |
| --- | --- |
| 1 | Single-antenna port, port 0 |
| 2 | Transmit diversity |
| 3 | Transmit diversity if the associated rank indicator is 1, otherwise large delay CDD |
| 4 | Closed-loop spatial multiplexing |
| 5 | Multi-user MIMO |
| 6 | Closed-loop spatial multiplexing with a single transmission layer |
| 7 | If the number of PBCH antenna ports is one, Single-antenna port, port 0; otherwise Transmit diversity |
| 8 | If the WTRU is configured without PMI/RI reporting: if the number of PBCH antenna ports is one, single-antenna port, port 0; otherwise transmit diversity. If the WTRU is configured with PMI/RI reporting: closed-loop spatial multiplexing |
| 9 | If the WTRU is configured without PMI/RI reporting: if the number of PBCH antenna ports is one, single-antenna port, port 0; otherwise transmit diversity. Closed-loop spatial multiplexing with up to 8 layer transmission, ports 7-14 |

Two types of reporting channels may be used, PUCCH and PUSCH. The PUCCH reporting channel may provide robust CSI feedback while allowing limited feedback overhead. The PUSCH reporting channel may allow large amounts of feedback overhead with less reliability. Therefore, the PUCCH reporting channel may be used for periodic CSI feedback for coarse link adaptation and the PUSCH reporting may be triggered aperiodically for finer link adaptation.

Table 3 is an example of reporting modes in LTE/LTE-A. Table 3 illustrates that for a frequency non-selective mode, the periodic CSI reporting channel may be PUCCH. For the frequency selective mode, the periodic CSI reporting channel may be PUCCH, while the aperiodic CSI reporting channel is PUSCH.

TABLE 3

| Scheduling Mode | Periodic CSI reporting channels | Aperiodic CSI reporting channel |
|---|---|---|
| Frequency non-selective | PUCCH | |
| Frequency selective | PUCCH | PUSCH |

The DL control channels may occupy the first 1 to 3 OFDM symbol(s) in every subframe according to the overhead of the control channels. This dynamic resource allocation to handle DL control channel overhead may allow efficient DL resource utilization, resulting in higher system throughput. Three types of DL control channels may be transmitted within the DL control channel region in every subframe including a Physical Control Format Indicator Channel (PCFICH), a Physical Hybrid-ARQ Indicator Channel (PHICH), and a Physical Downlink Control Channel (PDCCH). The DL control channel resource unit may be defined as 4 contiguous REs in frequency domain called Resource Elements Group (REG). If the CRS is located in the same OFDM symbol, the REG may be defined as 4 contiguous REs without CRS.

Figure 9:
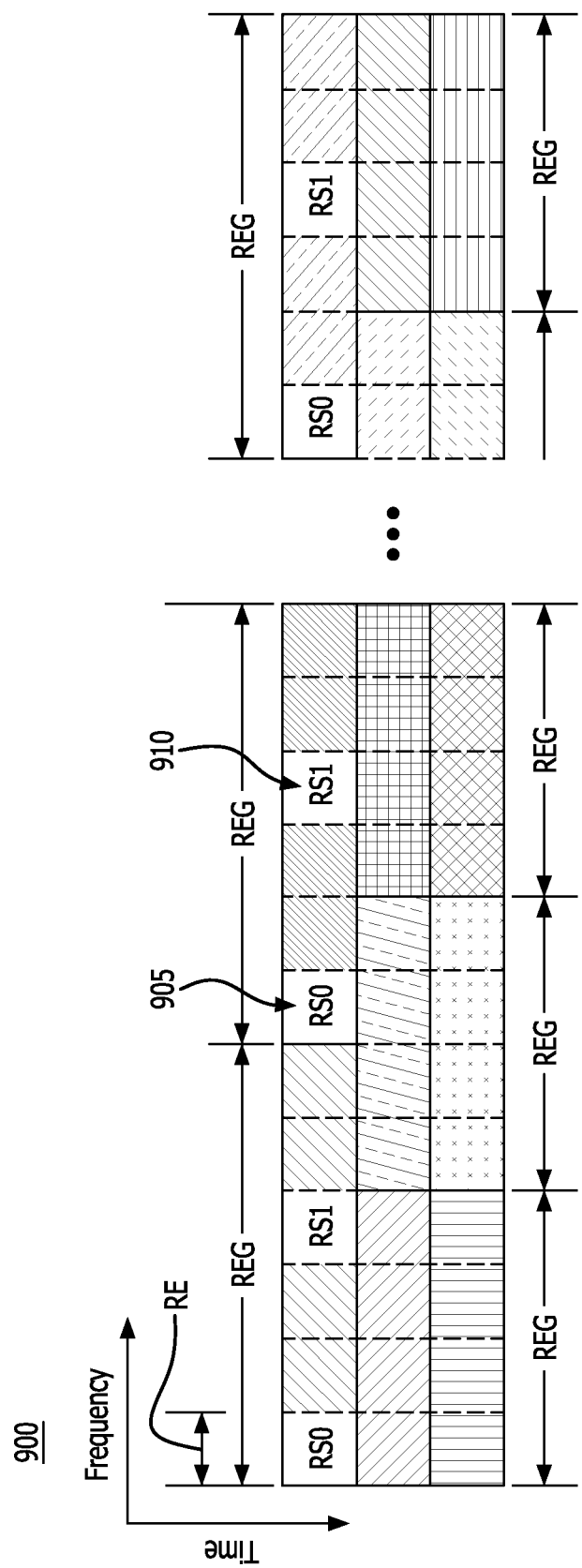
FIG. 9 is an example of a REG definition in downlink control channel region with 4Tx CRS.

FIG. 9 is an example of REG definition in a DL control channel region with 2TxCRS. The DL control channel resource unit may be defined as 4 contiguous REs in frequency domain called Resource Elements Group (REG) 900. The REG 900 has a 2TxCRS as shown by RS0 905 and RS1 910.

Figure 10:
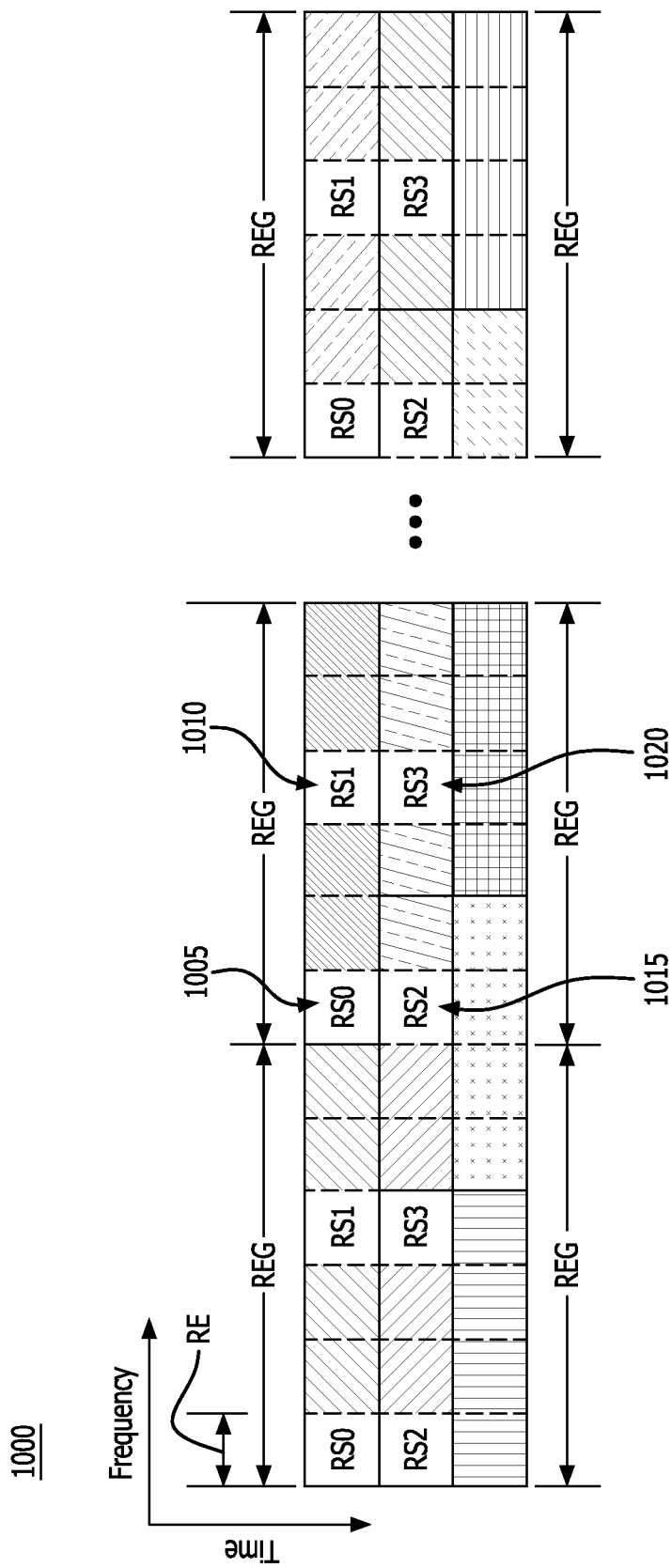
FIG. 10 is an example of a PCFICH REGs allocation according to PCI.

FIG. 10 is an example of REG definition in a DL control channel region with 4TxCRS. The DL control channel resource unit may be defined as 4 contiguous REs in frequency domain called Resource Elements Group (REG) 1000. The REG 1000 has a 4TxCRS as shown by RS0 1005, RS1 1010, RS2 1015, and RS3 1020.

A PCFICH may be transmitted in the 0th OFDM symbol in every subframe and it may indicate the number of OFDM symbols used for the DL control channel in the subframe. The subframe-level dynamic DL control channel resource allocation may be possible by using the PCFICH. A WTRU may detect a Control Format Indicator (CFI) from a PCFICH and the DL control channel region may be defined in the subframe according the CFI value.

Table 4 is an example of a CFI codeword detected from the PCFICH. The CFI=1, 2, and 3 indicate that one, two, and three OFDM symbol(s) may be used for the control region in the subframe when the bandwidth is larger than 6PRBs.

TABLE 4

| CFI | CFI codeword $<b_0, b_1, \ldots, b_{31}>$ |
|---|---|
| 1 | <0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1> |
| 2 | <1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0> |
| 3 | <1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1> |
| 4 (Reserved) | <0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0> |

As an exception, the PCFICH may be skipped if a subframe is defined as non-PDSCH supportable subframe so that a WTRU is not trying to detect PCFICH in the subframe.

Table 5 is an example of the number of OFDM symbols used for PDCCH.

TABLE 5

| Subframe | Number of OFDM symbols for PDCCH when $N_{RB}^{DL} > 10$ | Number of OFDM symbols for PDCCH when $N_{RB}^{DL} \leq 10$ |
|---|---|---|
| Subframe 1 and 6 for frame structure type 2 | 1, 2 | 2 |
| MBSFN subframes on a carrier supporting PDSCH, configured with 1 or 2 cell-specific antenna ports | 1, 2 | 2 |
| MBSFN subframes on a carrier supporting PDSCH, configured with 4 cell-specific antenna ports | 2 | 2 |
| Subframes on a carrier not supporting PDSCH | 0 | 0 |
| Non-MBSFN subframes (except subframe 6 for frame structure type 2) configured with positioning reference signals | 1, 2, 3 | 2, 3 |
| All other cases | 1, 2, 3 | 2, 3, 4 |

Four REGs may be used for PCFICH transmission in the 0th OFDM symbol in a subframe and the REGs may be uniformly distributed in whole system bandwidth in order to exploit frequency diversity gain. In addition, the starting point of PCFICH transmission may be different according to the physical cell-ID (PCI).

Figure 11:
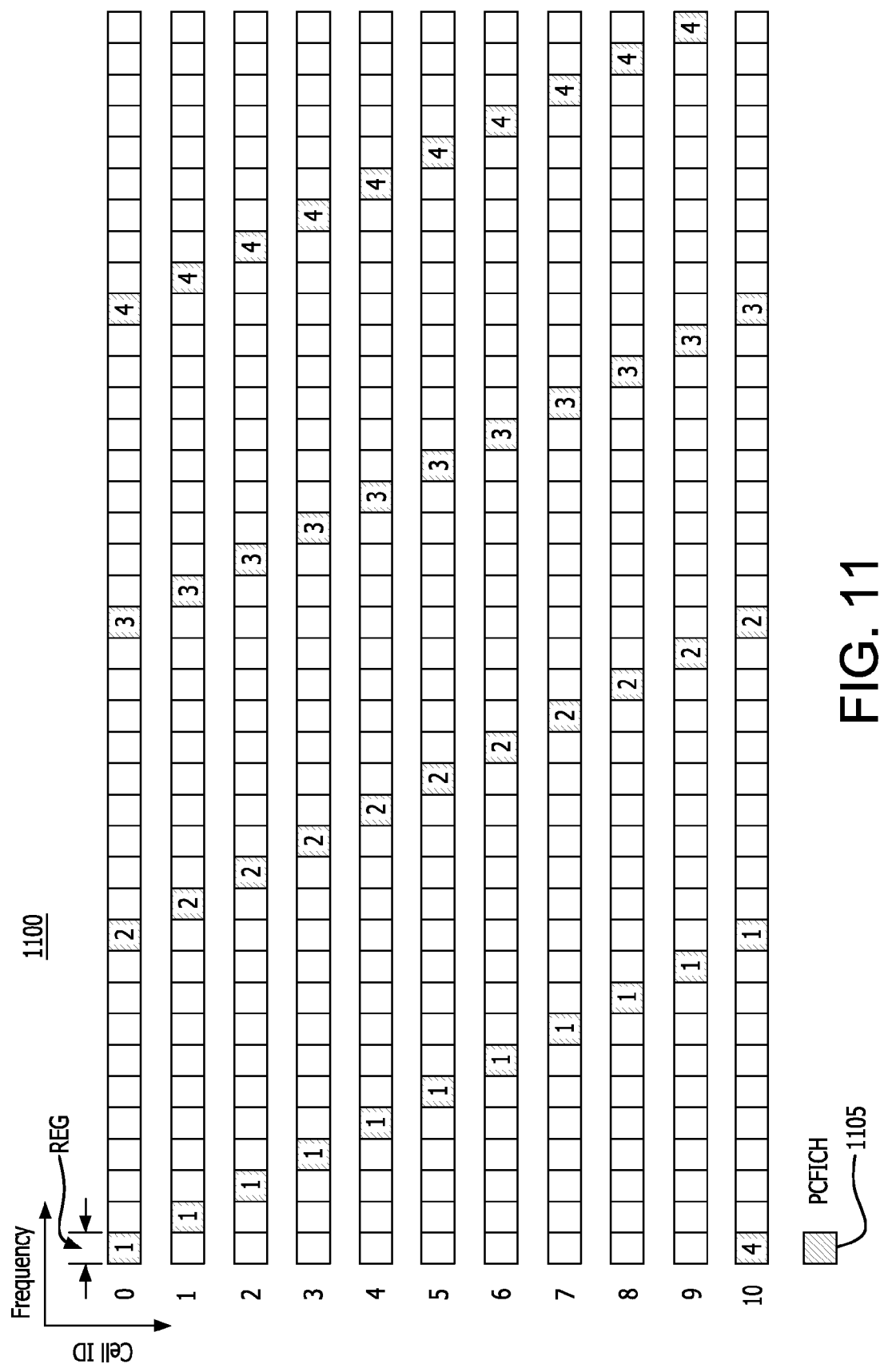
FIG. 11 is an example of a PCFICH and PHICH REGs allocation according to PCI.

FIG. 11 is an example of PCFICH REGs allocation according to PCI. The frequency shift of PCFICH 1105 tied with cell-ID may guarantee the performance of PCFICH 1105 detection performance by avoiding PCFICH 1105 collision among multiple neighbor cells while achieving diversity order four from its distributed allocation 1100. Meaning that 4 REGS may be distributed over the system bandwidth so that frequency diversity order four, since 4 REGS are distributed may be achieved. At a WTRU receiver, the first step for DL control channel detection may be decoding PCFICH 1105 to determine the number of OFDM symbols in the subframe. Given that the DL control resource is defined by PCFICH 1105, the PCFICH 1105 detection error may result in the loss of a DL grant, an UL grant, and PHICH reception.

A PHICH may be used to transmit ACK or NACK corresponding to the PUSCH transmitted in an UL subframe. A PHICH may be transmitted in a distributed manner across system bandwidth and OFDM symbols within DL control channel. The number of OFDM symbols may be defined as a PHICH duration and configurable via higher layer signaling. As opposed to the PCFICH, the PHICH resource position may vary according to PHICH duration.

Figure 12:
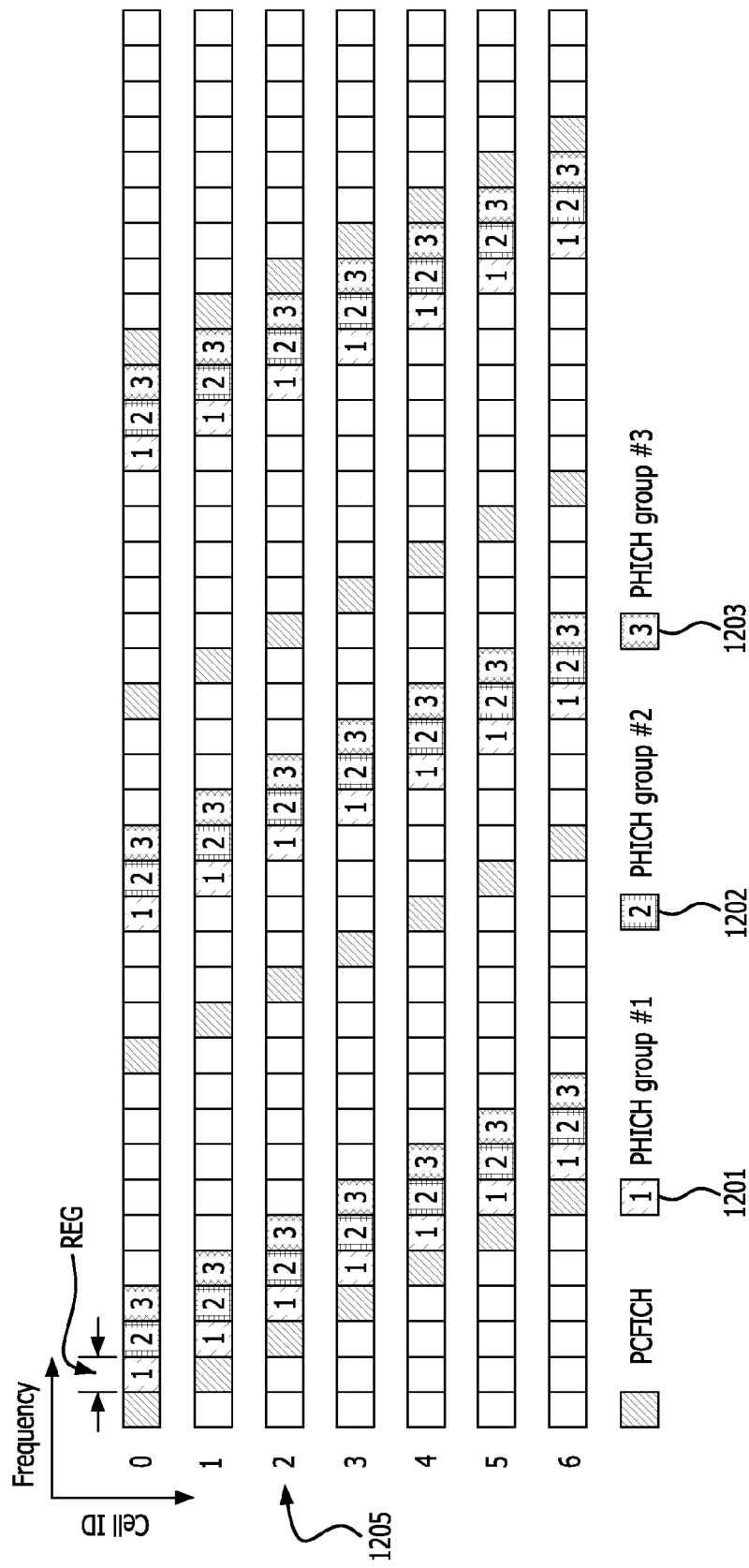
FIG. 12 is an example of ePDCCH multiplexing with PDSCH (FDM multiplexing)

FIG. 12 is an example of PCFICH and PHICH REGs allocation according to PCI. As illustrated in FIG. 12, multiple PHICH groups 1201, 1202, and 1203 may be defined in a cell, for example 1205. A PHICH group 1201, 1202, and 1203 may contain multiple PHICHs with orthogonal sequences. The PHICH for a WTRU may be defined dynamically with resource information in UL grant such as lowest PRB index ($1_{PRBRA}^{lowest\_index}$) and DM-RS cyclic shift ($n_{DMRS}$). Therefore, two index pair (PHICH group index: $n_{PHICH}^{group}$, PHICH sequence index: $n_{PHICH}^{seq}$) may indicate the PHICH resource for a specific WTRU. In the PHICH index pair ($n_{PHICH}^{group}$, $n_{PHICH}^{seq}$) each index may be defined as follows:

$$n_{PHICH}^{group} = (I_{PRBRA}^{lowest\_index} + n_{DMRS}) \mod N_{PHICh}^{group} \quad \text{Equation 3}$$

$$n_{PHICH}^{seq} = (I_{PRBRA}^{lowest\_index}/N_{PHICH}^{group} + n_{DMRS}) \mod 2N_{SP}^{PHICH} \quad \text{Equation 4}$$

where the $N_{PHICH}^{group}$ implies the number of PHICH groups available in the system and is defined as $$N_{PHICH}^{group} = \begin{cases} \lceil N_g(N_{RB}^{DL})/8 \rceil \\ 2 \cdot \lceil N_g(N_{RB}^{DL})/8 \rceil \end{cases}$$

where $N_g$ is 2 bit information transmitted via Physical Broadcasting Channel (PBCH) and the information is within $N_g \in \{1/6, 1/2, 1, 2\}$.

Table 6 is an example of the orthogonal sequence according to the sequence index and spreading factor.

TABLE 6

| Sequence index $n_{PHICH}^{seq}$ | Orthogonal sequence | |
|---|---|---|
| | Normal cyclic prefix $N_{SP}^{PHICH} = 4$ | Extended cyclic prefix $N_{SP}^{PHICH} = 2$ |
| 0 | [+1 +1 +1 +1] | [+1 +1] |
| 1 | [+1 −1 +1 −1] | [+1 −1] |
| 2 | [+1 +1 −1 −1] | [+j +j] |
| 3 | [+1 −1 −1 +1] | [+j −j] |
| 4 | [+j +j +j +j] | — |
| 5 | [+j −j +j −j] | — |
| 6 | [+j +j −j −j] | — |
| 7 | [+j −j −j +j] | — |

A Physical Downlink Control Channel (PDCCH) may be defined with one or multiple consecutive Control Channel Element (CCE) resources in which one CCE may contain 9 REGs. The number of available CCE ($N_{CCE}$) may be defined with $N_{CCE} = \lfloor N_{REG}/9 \rfloor$ where $N_{REG}$ is the number of REGs not assigned to PCFICH or PHICH. Table 7 is an example of supported PDCCH formats. Table 7 illustrates the available PDCCH formats by definition of number of consecutive CCEs.

TABLE 7

| PDCCH format | Number of CCEs | Number of resource-element groups | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

Table 8 is an example of the PDCCH candidates monitored by a WTRU. A WTRU may need to monitor a PDCCH and blindly decode the given number of times shown in Table 8 according to the search space.

TABLE 8

| Search space $S_k^{(L)}$ | | | Number of PDCCH |
|---|---|---|---|
| Type | Aggregation level L | Size [in CCEs] | candidates $M^{(L)}$ |
| WTRU-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Figure 13:
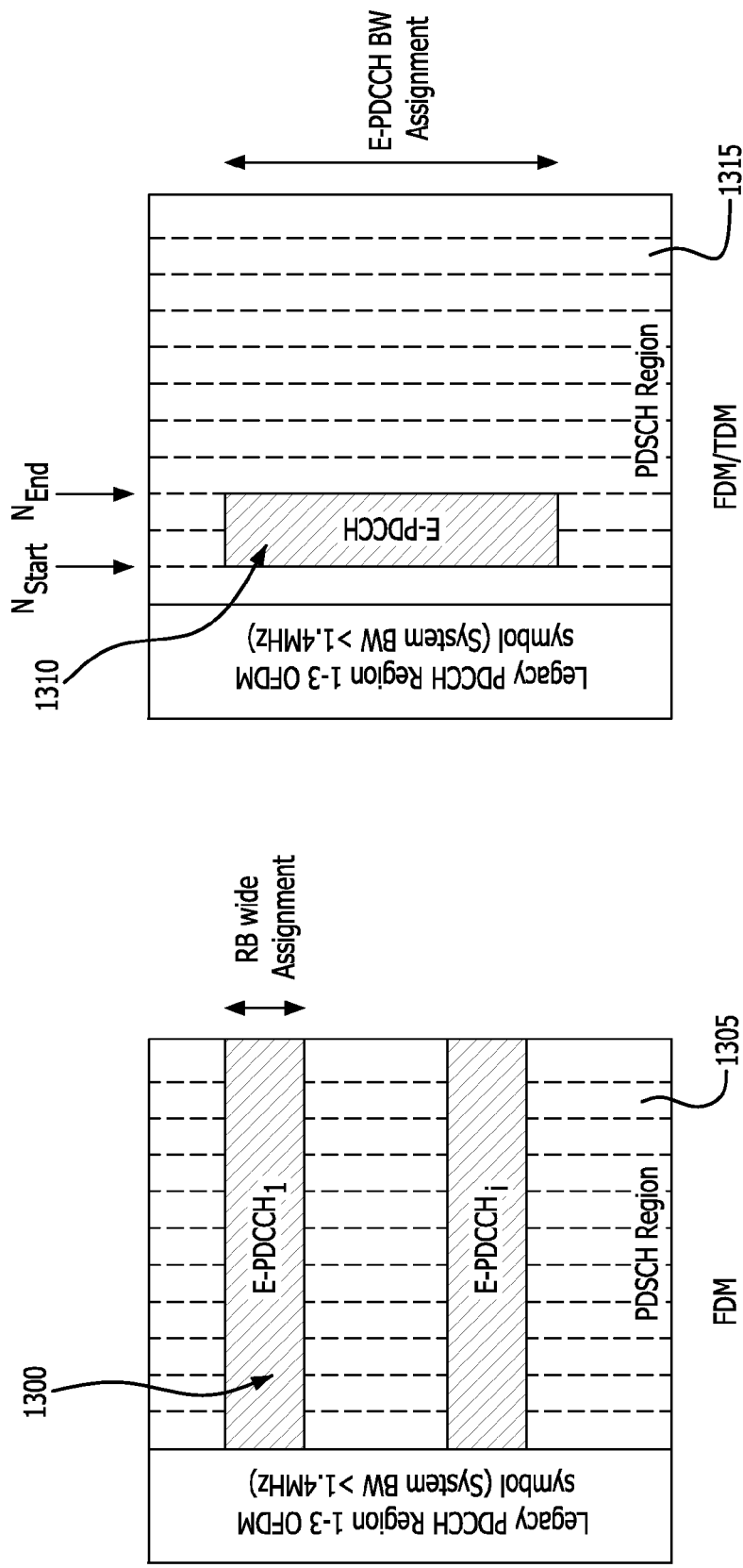
FIG. 13 is an example of a mapping to physical resource blocks for PUCCH.

FIG. 13 is an example of ePDCCH multiplexing with PDSCH (FDM) multiplexing. Legacy PDCCHs may be enhanced by transmitting PDCCHs 1300 in PDSCH 1305 region with WTRU-specific reference signal so that beamforming gain, frequency domain ICIC, and PDCCH capacity improvement gain may be achieved. Alternatively, the ePDCCH 1310 may be multiplexed with PDSCH 1315 in a TDM/FDM manner so that PDCCH capacity may improve and the time domain Inter-Cell Interference Coordination (ICIC) gain may be achieved.

The physical resources used for PUCCH may depend on two parameters, $N_{RB}^{(2)}$ and $N_{cs}^{(1)}$, given by higher layers. The variable $N_{RB}^{(2)} \geq 0$ may denote the bandwidth in terms of resource blocks that are available for use by PUCCH formats 2/2a/2b transmission in each slot. The variable $N_{cs}^{(1)}$ may denote the number of cyclic shift used for PUCCH formats 1/1a/1b in a resource block used for a mix of formats 1/1a/1b and 2/2a/2b. The value of $N_{cs}^{(1)}$ may be an integer multiple of $\Delta_{shift}^{PUCCH}$ within the range of $\{0, 1, \ldots, 7\}$, where $\Delta_{shift}^{PUCCH}$ is provided by higher layers. No mixed resource block may be present if $N_{cs}^{(1)} = 0$. At most one resource block in each slot may support a mix of formats 1/1a/1b and 2/2a/2b. Resources used for transmission of PUCCH formats 1/1a/1b, 2/2a/2b and 3 may be represented by the non-negative indices $n_{PUCCH}^{(1,\tilde{p})}$, $$n_{PUCCH}^{(2,\tilde{p})} < N_{RB}^{(2)} N_{sc}^{RB} + \left\lceil \frac{N_{cs}^{(1)}}{8} \right\rceil \cdot (N_{sc}^{RB} - N_{cs}^{(1)} - 2),$$

and $n_{PUCCH}^{(3,\tilde{p})}$, respectively.

The block of complex-valued symbols $z^{(\tilde{p})}(i)$ may be multiplied with the amplitude scaling factor $\beta_{PUCCH}$ in order to conform to the transmit power $P_{PUCCH}$, and may be mapped in sequence starting with $z^{(\tilde{p})}(0)$ to resource elements. PUCCH may use one resource block in each of the two slots in a subframe. Within the physical resource block used for transmission, the mapping of $z^{(\tilde{p})}(i)$ to resource elements (k, l) on antenna port p, and not used for transmission of reference signals, may be in increasing order of first k, then l and finally the slot number, starting with the first slot in the subframe.

The physical resource blocks to be used for transmission of PUCCH in slot n, may be given by $$n_{PRB} = \begin{cases} \left\lfloor \frac{m}{2} \right\rfloor & \text{if } (m + n_s \mod 2) \mod 2 = 0 \\ N_{RB}^{UL} - 1 - \left\lfloor \frac{m}{2} \right\rfloor & \text{if } (m + n_s \mod 2) \mod 2 = 1 \end{cases} \quad \text{Equation 5}$$

where the variable m may depend on the PUCCH format. For formats 1, 1a and 1b $$m = \begin{cases} N_{RB}^{(2)} & \text{if } n_{PUCCH}^{(1,\tilde{p})} < c \cdot N_{cs}^{(1)}/\Delta_{shift}^{PUCCH} \\ \left\lfloor \dfrac{n_{PUCCH}^{(1,\tilde{p})} - c \cdot \dfrac{N_{cs}^{(1)}}{\Delta_{shift}^{PUCCH}}}{c \cdot N_{sc}^{RB}/\Delta_{shift}^{PUCCH}} \right\rfloor + N_{RB}^{(2)} + \left\lceil \dfrac{N_{cs}^{(1)}}{8} \right\rceil & \text{otherwise} \end{cases}$$

$$c = \begin{cases} 3 & \text{normal cyclic prefix} \\ 2 & \text{extended cyclic prefix} \end{cases}$$

Equation 6 and for formats 2, 2a and 2b $$m = \lfloor n_{PUCCH}^{(2,\tilde{p})}/N_{sc}^{RB} \rfloor \quad \text{Equation 7}$$

and for format 3

$$m = \lfloor n_{PUCCH}^{(3,\tilde{p})}/N_{SF,0}^{PUCCH} \rfloor \quad \text{Equation 8}$$

Figure 14:
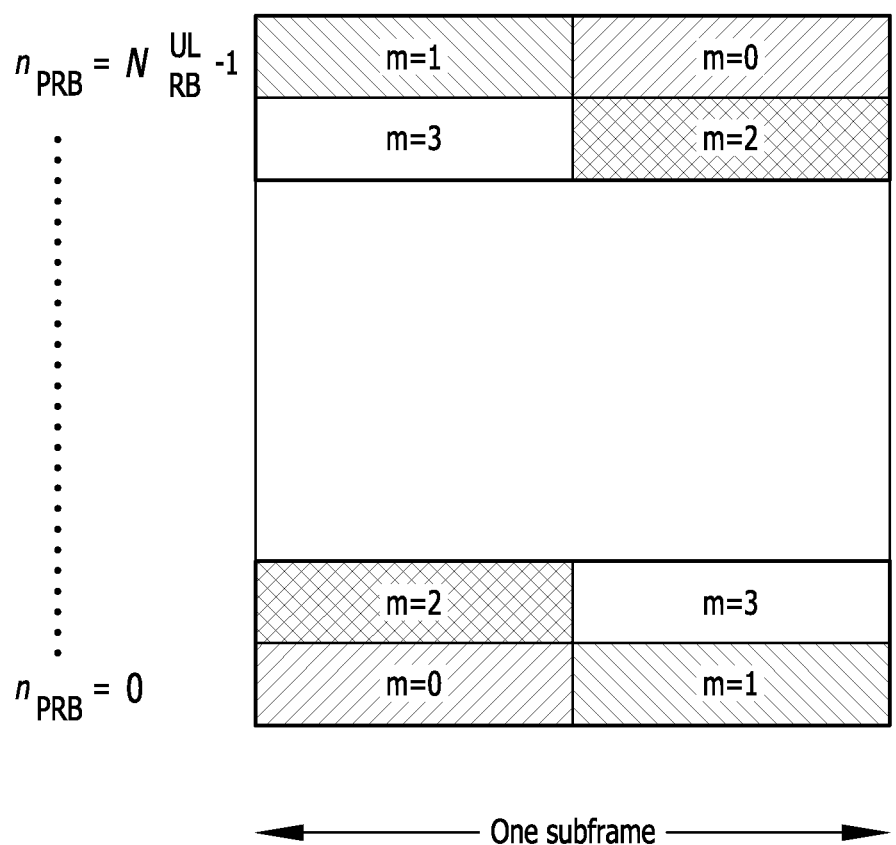
FIG. 14 is an example of TTI bundling with TTI bundle of 4 consecutive TTIs.

FIG. 14 is an example mapping of physical resource blocks for PUCCH. In the case of simultaneous transmission of a sounding reference signal and PUCCH format 1, 1a, 1b or 3 when there is one serving cell configured, a shortened PUCCH format may be used where the last Single Carrier (SC)-FDMA symbol in the second slot of a subframe 1400 may be left empty.

HARQ-ACK transmission on two antenna ports may be supported for PUCCH format 1a/1b. For FDD and one configured serving cell, the WTRU may use PUCCH resource $n_{PUCCH}^{(1,\tilde{p})}$ for transmission of HARQ-ACK in subframe n for $\tilde{p}$ mapped to antenna port p for PUCCH format 1a/1b, where:

1. For a PDSCH transmission indicated by the detection of a corresponding PDCCH in subframe n−4, or for a PDCCH indicating DL SPS release in subframe n−4, the WTRU may use $n_{PUCCH}^{(1,\tilde{p}_0)} = n_{CCE} + N_{PUCCH}^{(1)}$ for antenna port $p_0$, where $n_{CCE}$ may be the number of the first CCE (i.e. lowest CCE index used to construct the PDCCH) used for transmission of the corresponding DCI assignment and $N_{PUCCH}^{(1)}$ may be configured by higher layers. For two antenna port transmission the PUCCH resource for antenna port $p_1$ may be given by $n_{PUCCH}^{(1,\tilde{p}_1)} = n_{CCE} + 1 + N_{PUCCH}^{(1)}$.

2. For a PDSCH transmission on the primary cell where there is not a corresponding PDCCH detected in subframe n−4, the value of $n_{PUCCH}^{(1,\tilde{p})}$ may be determined according to higher layer configuration. For a WTRU configured for two antenna port transmissions, a PUCCH resource value may map to two PUCCH resources with the first PUCCH resource $n_{PUCCH}^{(1,\tilde{p}_0)}$ for antenna port $p_0$ and the second PUCCH resource $n_{PUCCH}^{(1,\tilde{p}_1)}$ for antenna port $p_1$ otherwise, the PUCCH resource value may map to a single PUCCH resource $n_{PUCCH}^{(1,\tilde{p}_0)}$ for antenna port $p_0$.

The FDD HARQ-ACK feedback procedures for more than one configured serving cell may either be based on a PUCCH format 1b with channel selection HARQ-ACK procedure as described herein or a PUCCH format 3 HARQ-ACK procedures as described herein.

HARQ-ACK transmission on two antenna ports ($p \in [p_0, p_1]$) may be supported for PUCCH format 3.

For FDD with two configured serving cells and PUCCH format 1b with channel selection, the WTRU may transmit b(0)b(1) on PUCCH resource $n_{PUCCH}^{(1)}$ selected from A PUCCH resources, $n_{PUCCH,j}^{(1)}$ where $0 \leq j \leq A-1$ and $A \in \{2, 3, 4\}$, in subframe n using PUCCH format 1b. HARQ-ACK(j) may denote the ACK/NACK/DTX response for a transport block or SPS release PDCCH associated with serving cell c.

A WTRU configured with a transmission mode that supports up to two transport blocks on serving cell, c, may use the same HARQ-ACK response for both the transport blocks in response to a PDSCH transmission with a single transport block or a PDCCH indicating DL SPS release associated with the serving cell.

The WTRU may determine the A PUCCH resources, $n_{PUCCH,j}^{(1)}$ associated with HARQ-ACK(j) where $0 \leq j \leq A-1$, according to:

1. For a PDSCH transmission indicated by the detection of a corresponding PDCCH in subframe n−4 on the primary cell, or for a PDCCH indicating DL SPS release in subframe n−4 on the primary cell, the PUCCH resource is $n_{PUCCH,j}^{(1)} = n_{CCE} + N_{PUCCH}^{(1)}$, and for transmission mode that supports up to two transport blocks, the PUCCH resource $n_{PUCCH,j+1}^{(1)}$ may be given by $n_{PUCCH,j+1}^{(1)} = n_{CCE} + 1 + N_{PUCCH}^{(1)}$, where $n_{CCE}$ is the number of the first CCE used for transmission of the corresponding PDCCH and $N_{PUCCH}^{(1)}$ is configured by higher layers.

2. For a PDSCH transmission on the primary cell where there is not a corresponding PDCCH detected in subframe n−4, the value of $n_{PUCCH,j}^{(1)}$ may be determined according to higher layer configuration. For transmission mode that supports up to two transport blocks, the PUCCH resource $n_{PUCCH,j+1}^{(1)}$ may be given by $n_{PUCCH,j+1}^{(1)} = n_{PUCCH,j}^{(1)} + 1$.

3. For a PDSCH transmission indicated by the detection of a corresponding PDCCH in subframe n−4 on the secondary cell, the value of $n_{PUCCH,j}^{(1)}$, and the value of $n_{PUCCH,j+1}^{(1)}$ for the transmission mode that supports up to two transport blocks may be determined according to higher layer configuration. The Transmit Power Control (TPC) field in the DCI format of the corresponding PDCCH may be used to determine the PUCCH resource values from one of the four resource values configured by higher layers. For a WTRU configured for a transmission mode that supports up to two transport blocks a PUCCH resource value may map to two PUCCH resources ($n_{PUCCH,j}^{(1)}$, $n_{PUCCH,j+1}^{(1)}$) otherwise, the PUCCH resource value may map to a single PUCCH resource $n_{PUCCH,j}^{(1)}$.

TTI bundling may aid the UL coverage of a WTRU experiencing limited UL converge and with transmission power approaching the maximum. By using TTI bundling in FDD, the same data may be transmitted in up to 4 consecutive TTIs allowing the WTRU to extend the effective transmission time window by up to 4 times, where a single transport block is coded and transmitted with different redundancy versions in those consecutive subframes. The same HARQ process number may be assigned to all TTIs in a TTI bundle. All TTIs within a TTI bundle may be treated as a single resource where a single UL grant having a single ACK/NACK, for example, PHICH, associated therewith. A TTI bundling mechanism may be configured by higher layer signaling per the WTRU. In FDD TTI bundling, the round trip propagation delay time (RTT) for every re-transmission may be equal to 16 ms. When the FDD TTI bundling is activated, the WTRU may receive the UL grant for the first subframe in the TTI bundle according to the rules of FDD UL grant. Once the UL data is transmitted in a TTI bundle, a PHICH (or another UL grant) may be expected by the WTRU according to the PHICH rules corresponding to the last subframe of that TTI bundle ("TTI" and "subframe" may be used interchangeably). The consecutive TTIs in the same TTI bundle may be assigned to consecutive redundancy versions (RVs).

Figure 15:
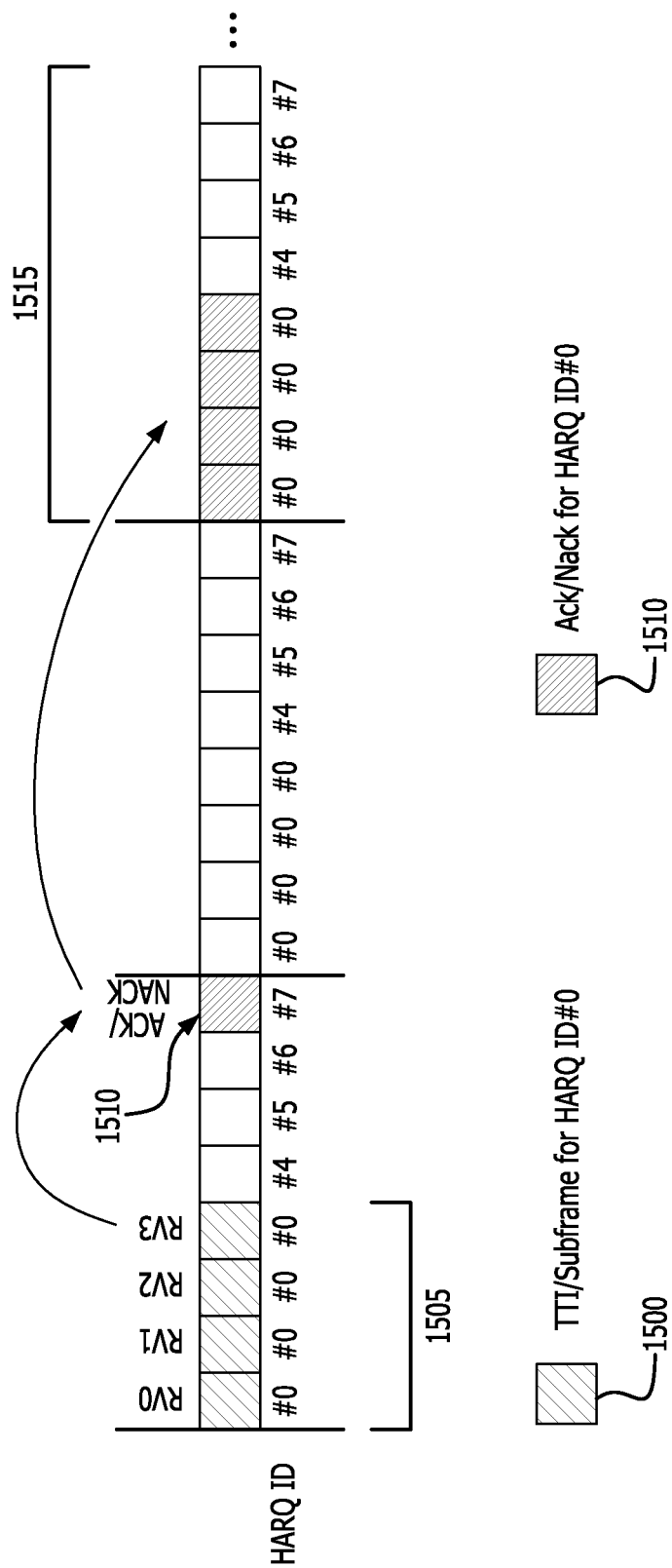
FIG. 15 is an example of HD-FDD HARQ processes and A/N timing.

FIG. 15 is an example of TTI bundling with a TTI bundle of 4 consecutive TTIs. FIG. 15 illustrates an example where the HARQ ID #0 1500 consists of 4 bundled TTIs 1505, the ACK/NACK 1510 is received in 4 TTIs after the last TTI of the TTI bundle and the re-transmission 1515 happens in 16 TTIs after the first TTI of the initial transmission.

Once FDD TTI bundling is activated, the WTRU may support up to 4 HARQ processes. In FDD operation all TTI bundles of the same HARQ process may have the same number of UL subframes and the same pattern, for example, include consecutive UL subframes, and may be uniformly distributed in the time domain.

According to embodiments described herein a fixed UL/DL subframe configuration, a dynamic UL/DL subframe configuration, a HARQ process for HD FDD, and switching time and scheduling request for HD FDD may be described.

Fixed UL/DL subframe configuration may include multi-slot LTE WTRU Class and configuration based on FDD HARQ timing.

In a multi-slot LTE WTRU class, to allow for operation of HD LTE FDD capable WTRU's in a LTE FDD system, a WTRU may support at least one, or possible a set of possibly multislot classes. A WTRU multislot class may identify certain WTRU capabilities. These may include how many DL subframes an HD WTRU may receive (DL) during a given reference or observable time period, and how many UL subframes an HD WTRU may transmit (UL) during a given reference or observable time period. For example, a time period may refer to a frame, multiple frame periods, or any other suitable time.

An HD multislot class may describe which DL subframes a WTRU may attempt to receive DL signals, and/or in which UL subframes a WTRU supporting that multislot class may be transmitting UL signals. For example, a first defined multislot class may define that a WTRU is capable to support reception of 2 DL subframes plus transmission of 1 UL subframe in a given one frame period. Or, a second multislot class may define that a WTRU is capable to support reception of 3 DL subframes plus transmission of 2 UL subframes for any given frame period. Furthermore, a multislot class may comprise identification, an order or a sequence of DL and UL subframes supported by a WTRU for transmission and/or reception respectively, and/or may identify during which subframes a WTRU may not be expected to receive or transmit signals.

For example, when enumerating subframes from 0 . . . 9 in a given frame period, a first multislot class supporting 2 DL Rx and 1 UL Tx may be indicated as DD0U000000, where D indicates a valid DL subframe, U indicates a valid U subframe and 0 indicates that the WTRU may not be expected to receive or transmit in that subframe. Similarly, a multislot class supporting 3 DL Rx and 2 UL Tx may be indicated as DDD0UU0000.

A given multislot class may define the number of supported DL and/or UL subframes and may describe an assumption regarding the length of an idle period between DL reception and UL transmission and vice-versa. For example, a WTRU supporting 3 DL Rx and 2 UL Tx using such a derived assumption of 1 idle subframe to allow for switching from Tx to Rx and vice-versa may be capable of supporting the following Tx/Rx configurations in a frame period: DDD0U . . . , DD0UU . . . , DD00UU . . . , DD000U . . . . At least one idle subframe may be required for Tx/Rx switching by the WTRU prior to recurrence of the expected DL reception period.

A WTRU supporting multislot class operation may switch to DL Rx upon start of the DL monitoring period according to its multislot class and/or signaling as described further below. Following a DL monitoring and/or DL reception period, a WTRU supporting a HD multislot class may switch to UL transmission upon start of the UL transmission period. Alternatively, the WTRU may skip the UL transmission period, such as in cases where no UL signal transmission is scheduled.

Supporting an HD multislot class may allow a WTRU implementation to benefit from reduced hardware cost, reduced baseband and software processing, increased battery stand-by, and reduced power-consumption. Furthermore, a given multislot class supported by a WTRU may be configured by the network to specifically identify expected DL Rx and UL Tx configurations.

The network may signal an identifier or offset value as one factor for determining which DL subframes the WTRU is expected to monitor for a first DL subframe. For example, for a WTRU supporting the example 3 DL Rx/2 UL Tx/1 Idle multislot class, an identifier or offset value signaled by the network configures the WTRU to assume DL Rx will start in subframes N. Using an example value of N1=5, a WTRU upon reception of the signaling message may correspondingly configure its receiver to start monitoring DL subframes according to the pattern 0000DDD0UU|0000DDD0UU| . . . . Another WTRU of that same example multislot class configured with an offset or indicator value of N2=4 however, may identify the following set of subframes as available for DL Rx and UL Tx, 000DDD0UU0|000DDD0UU0| . . . .

Specific DL RX subframes and UL Tx subframes supported by a multislot class may be subject to a randomization function. That is, within the confines of the total number of allowed DL versus UL subframes, a pre-defined deterministic or pseudo-random or computable function determines for a given period which subframes may correspond to DL Rx and UL Tx for that WTRU, or for a group of WTRUs. This randomization function may be dependent on cell, system or WTRU identifiers, or be dependent on counters such as a system frame number (SFN) or counters representing a progression of time.

A WTRU supporting an HD multislot class, upon network entry, may signal its supported multislot class or classes to the network. Following reception of a signaling message from a WTRU, the network may configure the WTRU into HD mode according to its received or indicated multislot capabilities. During network entry, such as prior to transmitting a first UL signal to the network, the WTRU supporting a multislot class may identify DL system signals such as timing or frequency acquisition signals, or DL system information or configuration information pertinent to access the system. A WTRU supporting a multislot class may switch into a first DL reception only mode, characterized in that no UL transmission is required. Either a fixed or variable, or all, DL subframes may be processed by the WTRU. Following acquisition and reception of essential DL system information to the point that the WTRU may legitimately access the network through UL transmission, the WTRU may switch to HD mode operation. In HD mode operation, the WTRU may transmit a first UL signal into at least one UL subframe, then may switch to DL reception according to its supported multislot capabilities, processes one or more received DL signals to obtain network configuration through one or more signaling messages, and so on.

A WTRU supporting a multislot class may receive cell- or system-specific DL system information. The cell- or system-specific DL system information may include paging messages through reception of dedicated DL signaling messages transmitted by the network. For example, a WTRU configured to operate according to the multislot class operation may decode for occurrences of paging or system notification or system information messages in the expected DL subframes. Alternatively, the WTRU, during a pre-determined amount of time, or in a configurable pattern, or through reception of signaling messages may revert from HD operation, and may change to DL reception only mode in order to acquire these signals or messages. While the WTRU operates according to its multislot class in the majority of frames, it may be allowed to skip UL transmission periods occurring to certain configurable or pre-determined timer values, such as in every tenth frame. The WTRU may switch to DL reception only, as a function of a timer or counter value, following periods of no UL transmission and/or DL reception activity.

A/N information corresponding to at least one received DL transmission by the WTRU in a DL subframe may be transmitted in at least one corresponding UL subframe. A WTRU following the reception of a DL signal in a first DL subframe may transmit an A/N in an UL subframe identified by, or obtained through, at least one parameter derived from a transmission setting, such as subframe number or sequence number. For example, the corresponding UL subframe, carrying A/N, may be derived from a fixed DL-UL timing relationship (within the constraints of the multislot class), or from a rule such as the first available UL subframe in the next frame, or through a DL-UL mapping relationship. The mapping relationship defining expected UL A/N transmission by the WTRU corresponding to receive DL signals may be different for different HD multislot classes.

For example, a WTRU supporting 2 DL Rx and 1 UL Tx in a configuration DD000U0000 may transmit A/N corresponding to the first and second DL subframes in UL subframe #6. Or, a WTRU supporting multislot class DD0U000000 may transmit A/N corresponding to DL subframes #1 and #2 in a first frame only in UL subframe #4 of the next following frame.

The above described principle of association between received DL signals and UL transmissions carrying A/N corresponding to these may be defined in multiple equivalent manners, such as fixed rules, association tables, or as a function of the time difference between DL and UL subframes.

Similarly to the A/N timing relationships between received DL signals and corresponding UL subframes, timing relationships defining DL subframes carrying A/N corresponding to transmitted UL signals by the WTRU may be possible. Similar approaches as described for the DL case above may be employed.

It is not necessary that DL-UL and UL-DL A/N relationships are the same. In fact, it may be expected that these may typically be different due to different numbers of DL versus UL subframes supported by given multislot classes, or different due to different timing periods occurring between a given DL and a given UL subframe.

In one exemplary technical realization, the timing relationships for DL-UL and/or UL-DL A/N transmission for WTRU's supporting a HD multislot class may correspond to those defined for TDD LTE operation, or a selected subset thereof. The above multislot class may use the notion of subframes, frames, and timeslots for exemplary descriptions. As is apparent, other suitable, yet equivalent reference time periods defining the expected DL and UL behavior by a WTRU may equally be employed.

The fixed UL/DL subframe configuration, incorporating a configuration based on FDD HARQ Timing, is also disclosed. In this configuration, the WTRU may receive indications of the UL/DL direction for some or possibly all subframes by one or combination of the following mechanisms. The WTRU may receive implicit and/or explicit indication of the UL/DL direction for every subframe or possibly a set of subframes. These indications of the subframes' UL/DL directions may include, but are not limited to, subframe UL/DL direction patterns. The WTRU may transmit only in a subframe, which may be indicated as an UL subframe. The WTRU may receive only in a subframe which may be indicated a DL subframe. The received UL/DL direction indication pattern(s) may be treated as repeatable pattern(s), until a new pattern(s) may be received by the WTRU.

As an example of an explicit and/or implicit pattern, the UL/DL subframe direction pattern received by the WTRU may be interpreted as a bit-sequence, where each bit may indicate the direction of one or possibly a set of subframes. For example, having the value of one bit in that sequence equal to '1' may indicate that one subframe (or possibly a set of subframes) may be configured as a DL subframe(s), whereas the value '0' of that bit may indicate that that subframe (or possibility a set of subframes) may be configured as an UL subframe(s). Alternatively, the interpretation of the bit value may be switched.

The bit-sequence pattern(s) may have different length(s). As an example, the length of the bit-sequence pattern may be set to 40 bits, which may represent the direction of possibly 40 consecutive subframes (for example, corresponding to a period of 40 ms) which may include four consecutive radio frames. As another example, the length of the bit-sequence pattern may be set to 4 bits which may represent 4 consecutive subframes, for example, corresponding to a period of 4 ms.

The bits of the bit-sequence may indicate the UL/DL direction of non-consecutive subframes. For example, the length of the bit-sequence pattern may be set to 8 bits, where those bits may indicate the UL/DL direction of subframes #0 and #5 of four consecutive radio frames. A WTRU may not expect to receive any data and/or signaling for some or all subframes #0 and/or #5 in some radio frames.

The UL/DL direction pattern may implicitly indicate the UL/DL direction of the subframes. The WTRU may be required to use some rules to determine the actual UL/DL direction of the subframes from the possibly received UL/DL direction pattern.

Figure 16:
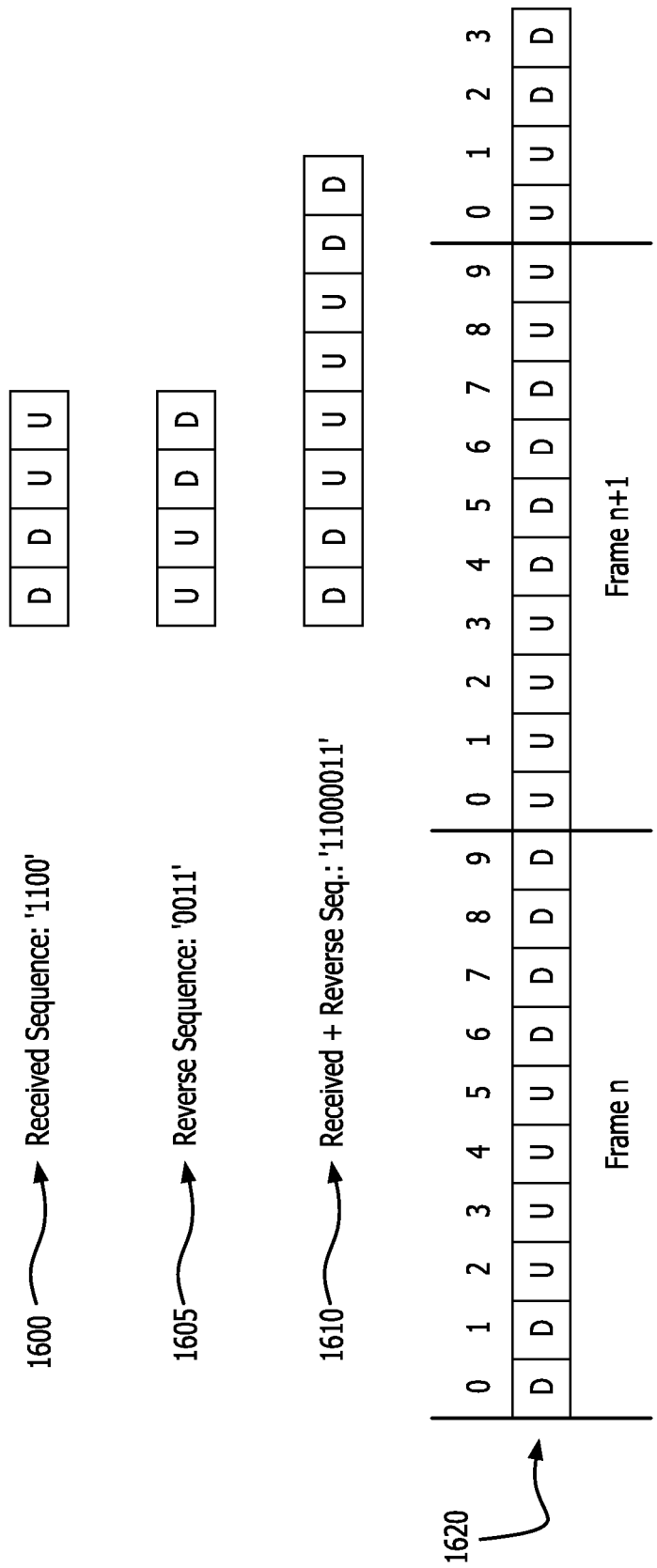
FIG. 16 is an example of a subframe UL/DL direction configuration, where first a four-bit UL/DL pattern may be received, then it may be concatenated with its reversed version and after the constructed eight-bit pattern may be used as the actual subframe UL/DL directions.

FIG. 16 is an example subframe UL/DL configuration, where first a four-bit UL/DL pattern is received, then concatenated with its reversed version, and after the constructed eight-bit pattern is used as an actual subframe for UL/DL directions. In an example, the WTRU may receive a four-bit bit-sequence pattern indicating the UL/DL directions of the first four consecutive subframes, however, the UL/DL directions of the second four subframes may correspond to the reverse directions indicated by the received pattern. UL/DL directions of these eight subframes may be used repeatedly for next subframes. For example, as illustrated in FIG. 16, the WTRU may receive bit-sequence pattern '1100' 1600 and implicitly derive the 8-bit pattern by concatenating the received four-bit pattern with its reverse version '0011' 1605 resulting in '11000011' 1610 implying 'DDUUUUDD' directions, where 'D' may represent a DL subframe and 'U' may represent an UL subframe. This eight-bit pattern may be repeated for all subframes 1620.

The WTRU may receive the indication of the UL/DL directions of subframe in more than one pattern; that is, in more than one (possibly interpreted) bit-sequence. In the case of having the direction of some subframes indicated by more than one pattern ((possibly interpreted) bit-sequence), different patterns may be assigned with different priorities and therefore, one pattern may be prioritized over other pattern(s) for some subframes, for example, if different directions are assigned to the same subframe.

Figure 17:
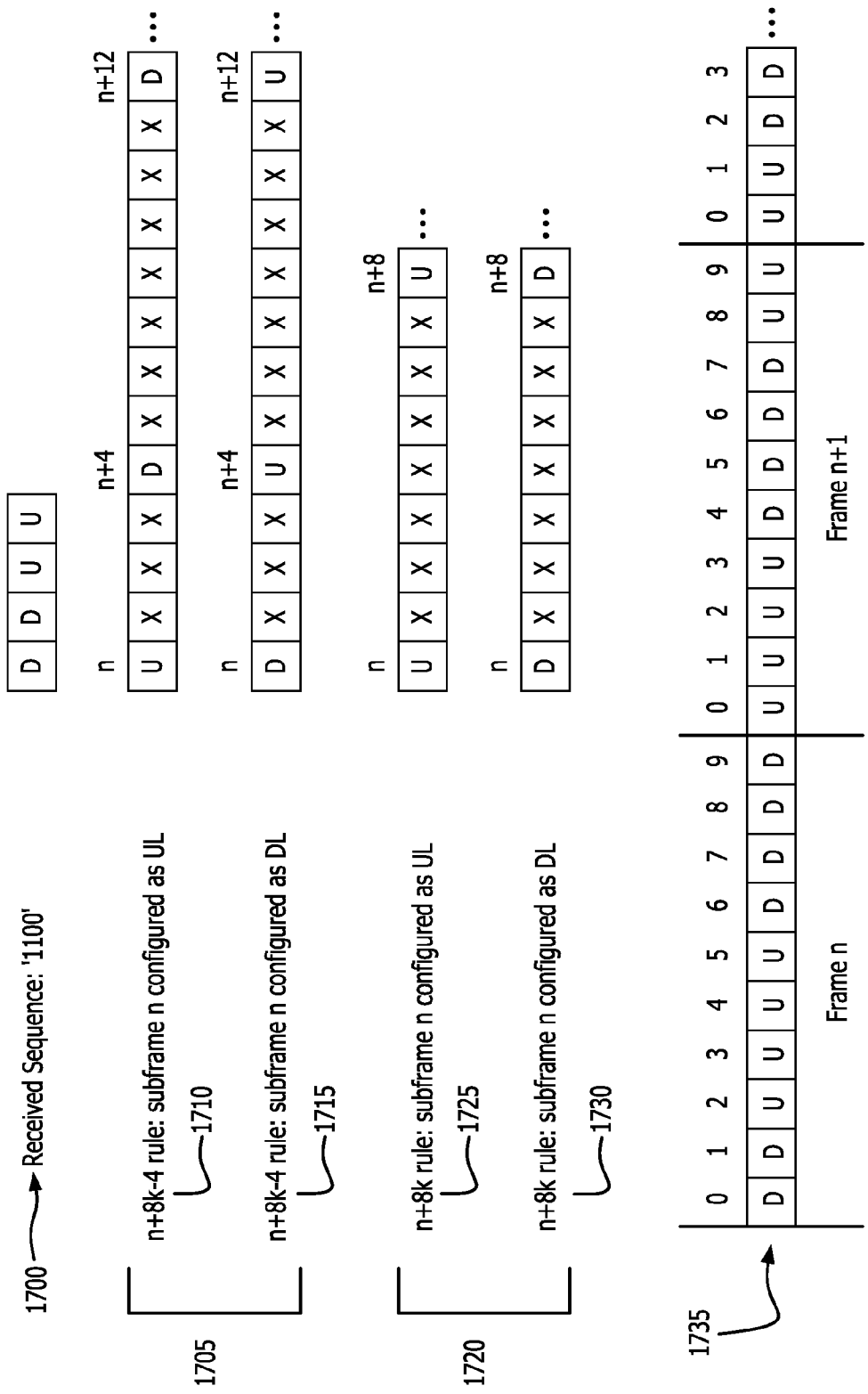
FIG. 17 is an example of a subframe UL/DL direction configuration, where first a four-bit UL/DL pattern may be received, then the direction of the rest of the subframes may be indicated based on n+8k and n+8k−4 rules.

FIG. 17 is an example subframe UL/DL direct configuration, where first a four-bit UL/DL pattern is received, then the direction of the rest of the subframes is indicated based on n+8k and n+8k−4 rules. In an example of the rule(s) that a WTRU may possibly use to determine the actual UL/DL direction of the subframes from a possibly received UL/DL direction pattern, the WTRU may assume or may be indicated that once a subframe n is indicated as a DL (or UL) subframe possibly in the received pattern, then subframes n+8k, where k is an integer value greater than 0, may also be DL (or UL) subframes. For example, as illustrated in FIG. 17, the WTRU may receive a bit-sequence pattern '1100' 1700 and may use the n+8k rule 1720 to determine the direction of the subframes; if subframe n is DL subframe, then subframes n+8k may be indicated as DL subframes 1730, and if subframe n is an UL subframe, then subframes n+8k may be indicated as UL subframes 1725. In FIG. 17, value '1' is interpreted as DL direction and value '0' is interpreted as UL direction. Also the UL subframes are marked as 'U' and DL subframes are marked as 'D'. Subframes with undetermined UL/DL directions are marked as 'X'. The final UL/DL direction pattern may include the union of all implicitly and/or explicitly indicated UL/DL directions.

In an example of a rule that a WTRU may possibly use to determine the actual UL/DL direction of the subframes from a possibly received UL/DL direction pattern, the WTRU may assume or may be indicated that once a subframe n is indicated as a DL (or UL) subframe possibly in the received pattern, then subframes n+8k−4, where k is an integer value greater than 0, are UL (or DL) subframes. For example, as illustrated in FIG. 17, the WTRU may receive a bit-sequence pattern '1100' 1700 and may use the n+8k−4 rule 1705 to determine the direction of the subframes; if subframe n is DL subframe, then subframes n+8k−4 may be indicated as UL subframes 1710, and if subframe n is an UL subframe, then subframes n+8k−4 may be indicated as DL subframes 1715. In FIG. 17, value '1' is interpreted as DL direction and value '0' is interpreted as UL direction. Also the UL subframes are marked as 'U' and DL subframes are marked as 'D'. Subframes with undetermined UL/DL directions are marked as 'X'. The final UL/DL direction pattern 1735 may include the union of all implicitly and/or explicitly indicated UL/DL directions.

Any (implicit and/or explicit) rules and/or indications regarding the UL/DL subframe direction may have an assigned priority and may be overridden by other (implicit and/or explicit) rules and/or indications with higher priority. Upon the reception of a DL grant in a DL subframe, the WTRU UL HARQ timing may follow the DL scheduling and DL HARQ timing of FDD operation. The WTRU may not transmit DL HARQ feedback if the corresponding subframe for that feedback is not an UL subframe. Upon the reception of an UL grant in a DL subframe, the WTRU may follow the UL scheduling and UL HARQ timing of FDD operation. The WTRU may not expect UL HARQ feedback if the corresponding subframe for that feedback is not a DL subframe. Upon the reception of a PUSCH re-transmission request by the WTRU, the WTRU may not re-transmit the PUSCH if the corresponding subframe for that re-transmission is not an UL subframe.

Dynamic UL/DL subframe configuration may be performed implicitly and/or explicitly. A definition of half duplex FDD (HD-FDD) WTRU is performing either UL transmission or DL reception at a time in different frequency bandwidths for UL and DL. Assuming that HD-FDD WTRUs are supported in FDD network, the UL and DL subframe may be WTRU-specific.

With respect to implicit configuration, HD-FDD WTRU behavior in an FDD network may be defined as at least one of the following: a WTRU may assume that subframe n is a DL subframe unless the subframe n is used for UL with at least one of following purposes (defined below) for the WTRU; a WTRU may assume that subframe #0 and #5 are always DL subframe, therefore any UL transmissions scheduled/configured are dropped in the subframe; a WTRU may assume that subframe #0 and #5 are DL subframes except for at least one of following cases (defined below); and a WTRU may assume that the subframes configured for RACH response as an UL subframe after finishing the reception of the broadcasting information even for the subframe #0 and/or #5.

A WTRU assumes that subframe n is a DL subframe unless the subframe n is used for UL with at least one of following purposes for the WTRU. UL resources may be granted for PUSCH transmission in the subframe n−4. Periodic CSI reporting may be configured and the WTRU may need to report the periodic CSI reporting in the subframe n. Aperiodic CSI reporting may be triggered in the subframe n−4, thus requiring CSI feedback in the subframe n. A PDSCH may be received in the subframe n−4 so that the WTRU may need to transmit HARQ_ACK in the subframe n. Periodic SRS (sounding reference signal) may configured for the WTRU and the WTRU may need to transmit SRS in the subframe n. A periodic SRS may be triggered in the subframe n−4 so that the WTRU may need to transmit SRS in the subframe n. Semi-persistent scheduling (SPS) may be granted and the subframe n may be configured for SPS transmission. A WTRU may need to transmit scheduling request (SR) in the subframe n.

A WTRU may assume that subframe #0 and #5 are DL subframes except for at least one of following cases. A subset of radio frames may be defined as HD-FDD specific radio frame in which a WTRU may follow HD-FDD rules. A WTRU may have received PDSCH in the subframe n−4, where n is either 0 or 5. In this case, the WTRU may consider the subframe #0 or #5 as UL subframe to transmit HARQ_ACK. A WTRU may need to transmit scheduling request (SR) in the subframe n. A periodic SRS may be triggered in the subframe n−4 so that the WTRU needs to transmit SRS in the subframe n.

With respect to the explicit configuration, cell-specific UL subframes may be configured so that an HD-FDD WTRU may assume that all subframes other than cell-specific UL subframes are DL subframes. Within the cell-specific UL subframe, WTRU-specific UL subframe may be further configured as follows: a bitmap may indicate WTRU-specific UL subframes with multiples of TTIs; within the WTRU-specific UL subframes, if a WTRU may have any signal to transmit a WTRU-specific UL subframe, the WTRU may be requested to monitor DL subframes; and for broadcasting information, an eNB scheduler may guarantee that all broadcasting information is transmitted in a subframe other than cell-specific UL subframes.

When the bitmap indicates WTRU-specific UL subframe with multiples of TTIs, 10, 20, and/or 40 ms duty cycle based WTRU-specific UL subframe configuration may be used. The bitmap may be different according to the WTRU. The bitmap may be informed via higher layer signaling.

When the WTRU is requested to monitor DL subframe, the WTRU behavior may monitor a WTRU-specific search space only, may monitor a common search space only, may assume that an UL grant is only transmitted in the subframe, may assume that a DL grant is only transmitted in the subframe, may assume that an UL grant and fall-back transmission is only transmitted in the subframe so that the WTRU only monitors DCI format 0/1A, or may assume that group power control is only transmitted in the subframe so that the WTRU only monitors DCI format 3/3A to reduce blind decoding complexity at a WTRU receiver.

In order to allow more flexible DL subframe configurations, a WTRU may be configured with a subset of UL transmissions as at least one of following: Type-1 or Type 2.

For Type-1, an HD-FDD WTRU may not have any UL signaling restriction and may behave exactly the same as regular FDD WTRUs. For Type-2, an HD-FDD WTRU may not support periodic CSI reporting or periodic SRS transmission, and the UL subframe supposed to be used for periodic CSI reporting or periodic SRS transmission may be reused as DL subframes. Since this type-1 WTRU may not include periodic UL signaling, except for the semi-persistent scheduling, the WTRU may consider that all subframes are DL subframe unless the WTRU receives grant/trigger in the subframe n−4.

When the WTRU does not have periodic CSI reporting and SRS transmission, opportunistic periodic signal transmission may be used so that a WTRU may transmit the periodic signal. A WTRU may be granted for PUSCH transmission in subframe n, and then the WTRU may use piggyback the periodic signaling in the PUSCH. A closest UL subframe may be configured as WTRU-specific UL subframe. For example, if a WTRU is supposed to report periodic CSI in the subframe n−2, which is configured as DL subframe, and the subframe n is configured WTRU-specific UL subframe, the WTRU may report periodic CSI in the subframe n.

In full FDD operation, an 8 channel H-ARQ process may be used and the subset of H-ARQ processes may be dynamically selected for the HD-FDD WTRUs.

The HARQ Process for HD-FDD may include HARQ-less operation and asynchronous HARQ procedure. If HARQ-less operation is used, a physical link adaptation and outer-loop power control may not be supported so that physical resource utilization may not be efficient as before. To minimize the inefficient resource utilization impact, at least one of followings may be considered.

A WTRU may report delta CQI via higher layers which takes the received SINR and required SINR for the transmitted Modulation and Coding Scheme (MCS) into account. For instance, the delta CQI may be defined in the following manner, delta CQI=[required SINR for the transmitted MCS−received SINR]. The delta CQI may be averaged with a weight for a certain timing duration. A WTRU may report a number of errors (HARQ_NACK) in a given time windows via higher layers. A WTRU may report a ratio of HARQ_ACK and HARQ_NACK. The reporting may be transmitted in either a periodic or aperiodic manner.

During HARQ-less operation all transport blocks, corresponding to a higher layer ARQ operation, may be retransmitted since higher layer ACK/NACK may trigger retransmission of a higher layer packet; although a subset of the transport blocks corresponding to the higher layer packet may only contain errors. A higher layer packet may contain one or more transport blocks. To reduce the physical resource waste for retransmitting the transport blocks successfully received, a transport block number may be transmitted together with an UL/DL grant so that the WTRU and/or eNB may inform the subset of transport blocks, which may include errors for the retransmission purpose. The transport block number may be included in DCI format. The transport block number may be counted implicitly at a receiver.

In an asynchronous HARQ Procedure, the DL may be using asynchronous HARQ and the UL may be using synchronous HARQ procedure in FD-FDD. When an LTE WTRU is configured with HD-FDD mode, a new signaling scheme may be needed to support asynchronous for UL HARQ in PDCCH without increasing DCI blind decoding complexity. This may be achieved by reinterpreting some fields of the corresponding DCI formats for UL data transmission (that is, the scheduling of PUSCH). DCI format 0 may be used for the transmission of UL-SCH assignments. Table 9 is an example of PDCCH DCI format 0 messages.

TABLE 9

| DCISTR Fields | Size | Description |
| --- | --- | --- |
| FreqHopping | 1-bit | PUSCH frequency hopping flag |
| Allocation | variable | Resource block assignment/allocation |
| ModCoding | 5-bits | Modulation, coding scheme and redundancy version |
| NewData | 1-bit | New data indicator |
| TPC | 2-bits | PUSCH TPC command |
| CShiftDMRS | 3-bits | Cyclic shift for DM RS |
| CQIReq | 1-bit | CQI request |
| TDDIndex | 2-bits | For TDD config 0, this field is the Uplink Index. For TDD Config 1-6, this field is the Downlink Assignment Index. Not present for FDD. |

New signaling, supporting asynchronous UL HARQ, may include a HARQ process number by reinterpreting some fields of DCI format 0. Unused TDDIndex (2-bits) may be interpreted for HARQ processes index. Therefore, up to 4 HARQ processes may be presented for asynchronous HARQ procedure.

Table 10 is an example of PDCCH DCI format 0 messages for HD-FDD to support asynchronous HARQ. The reinterpreting from TDDIndex field to HARQ processes index field is shown in Table 10. In this way, there may be no need to redesign DCI format 0 and thus maintain the same blind PDCCH decoding effort for legacy WTRU and LTE-A WTRU. Although, the maximum number of HARQ that may be supported is reduced from 8 to 4 for supporting asynchronous HD-FDD HARQ by reinterpreting TDDIndex filed, this may increase HD-FDD transmission efficiency. This is because TTI bundling may be supported in current LTE standard and it may be utilized with asynchronous HARQ to improve HD-FDD transmission efficiency. TTI bundling may help to reduce HARQ processes number and the corresponding number of A/Ns. In this way, the number of subframes reserved for HD-FDD operation due to switching time (ST) may be reduced and the performance of UL transmission may be improved because more subframes may be used for the UL scheduler. In addition, reinterpreting of DCI format 0 may not introduce any ambiguity between the legacy WTRU and HD-FDD WTRU because different WTRUs DCI format 0 CRC may be masked with different RNTI.

TABLE 10

| DCISTR Fields | Size | Description |
| --- | --- | --- |
| FreqHopping | 1-bit | PUSCH frequency hopping flag |
| Allocation | variable | Resource block assignment/allocation |
| ModCoding | 5-bits | Modulation, coding scheme and redundancy version |
| NewData | 1-bit | New data indicator |
| TPC | 2-bits | PUSCH TPC command |
| CShiftDMRS | 3-bits | Cyclic shift for DM RS |
| CQIReq | 1-bit | CQI request |
| HARQIndex | 2-bits | 0, 1, 2, 3 HARQ processes |

Figure 18:
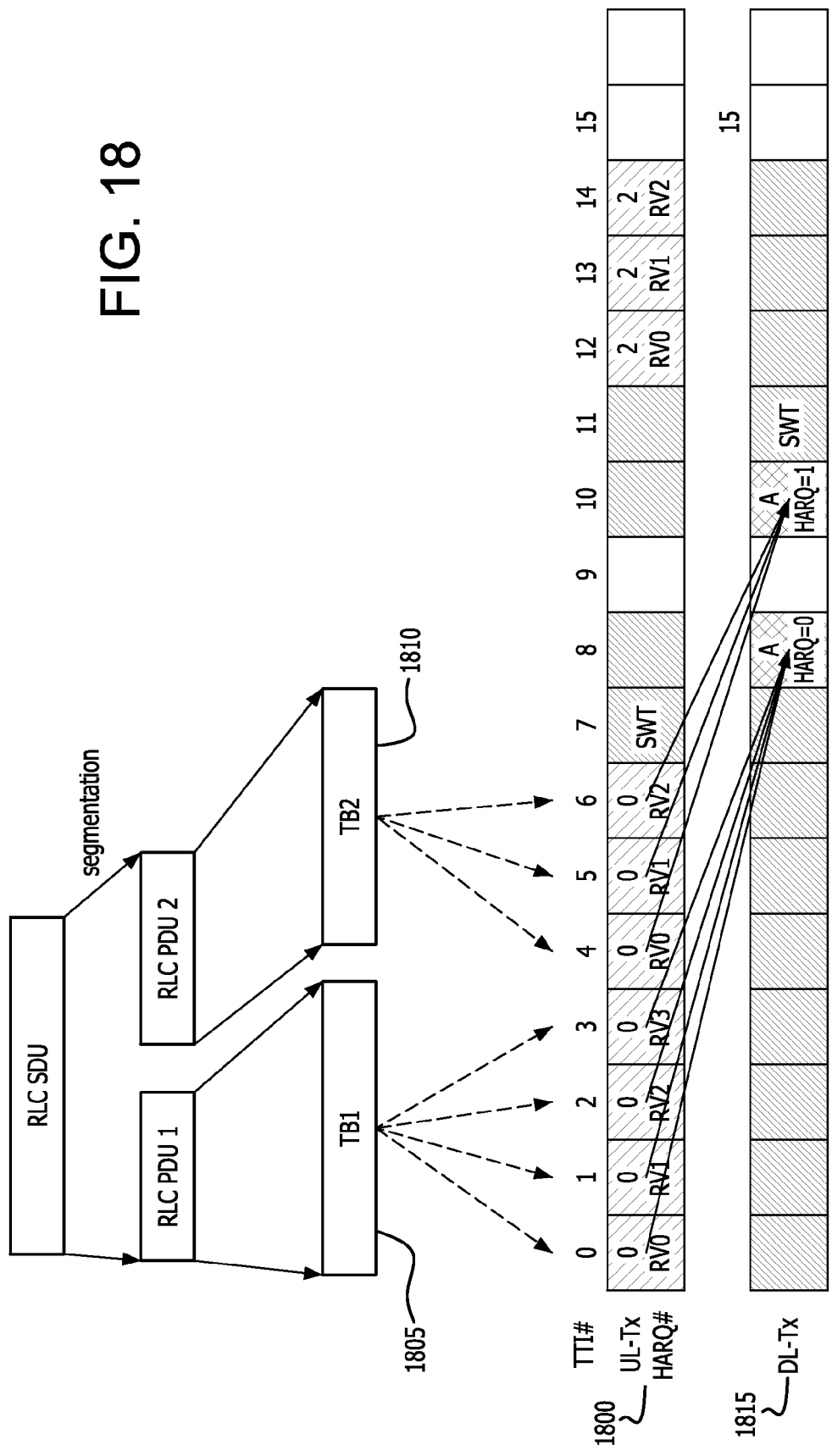
FIG. 18 is an example of HD-FDD asynchronous HARQ processes with TTI bundling.

FIG. 18 is an example of HD-FDD asynchronous HARQ processes with TTI bundling. FIG. 18 shows an UL-Tx HARQ 1800. The UL-Tx HARQ 1800 includes two TTI bundles 1805 and 1810. The first TTI bundle 1805 includes 4 RVs (RV0, RV1, RV2, and RV3). The second TTI bundle 1810 includes 3 RVs (RV0, RV1, and RV2). Each TTI bundle may have a corresponding A/N in the DL-Tx 1815.

New transmission mode with signaling supporting asynchronous UL HARQ may include HARQ process number by reinterpreting some fields of DCI format 0. When a new transmission mode is defined for HD-FDD, DCI format 0 may be reinterpreted from current supported DCI format 0. For example, the FreqHopping (1-bit) and TDDIndex (2-bit) may be converted into HARQIndex. In this way, up to 8 HARQ processes may be supported as same as current UL transmission scheme. Data Assignment Index (DAI) to allow multiple HARQ_ACK/HARQ_NACK indications may be introduced when there is a need either for multiple HARQ_ACK/HARQ_NACK multiplexing or bundling.

Table 11 is an example of PDCCH DCI format 0 message for HD-FDD to support asynchronous HARQ.

TABLE 11

| DCISTR Fields | Size | Description |
| --- | --- | --- |
| HARQIndex | 1-bit | 0, 1, 2, . . . , 7 HARQ processes |
| Allocation | variable | Resource block assignment/allocation |
| ModCoding | 5-bits | Modulation, coding scheme and redundancy version |
| NewData | 1-bit | New data indicator |
| TPC | 2-bits | PUSCH TPC command |
| CShiftDMRS | 3-bits | Cyclic shift for DM RS |
| CQIReq | 1-bit | CQI request |
| HARQIndex | 2-bits | 0, 1, 2, . . . , 7 HARQ processes |

Switching Time and Scheduling Request for HD-FDD may include switching timing configuration and scheduling request (SR) transmission. For HD-FDD WTRU a switching time (ST) to retune to a different frequency when switching from DL to UL (DL-UL) and/or from UL to DL (UL-DL) may be needed.

For a switching timing configuration, for HD-FDD WTRU, a ST to retune to a different frequency, when the HD-FDD WTRU switches from DL to UL and/or from UL to DL may be need. ST for DL-to-UL may be implemented by muting one or more OFDM symbols in the subframe immediately preceding an UL transmission. Similarly, ST for UL-to-DL may also be implemented by muting the first part of an UL subframe immediately following a DL subframe to that WTRU. Alternatively, timing advance may be increased to accommodate ST. In the case that the WTRU is required to transmit in UL in a sub-frame immediately following a reception sub-frame, timing advance may need to accommodate both the round trip propagation delay time (RTT) and RF switching time for UL-to-DL. RF switching time may be related to each WTRU implementation, so switching time may be WTRU-specified. RTT may also be related to the distance between each WTRU and eNB and it may be signaled from eNB to the WTRU.

Table 12 is an example of switching time and timing advance for an HD-FDD WTRU. Table 12 shows the switching time for DL-to-UL and Timing advance for UL-to-DL based on different cell size, RTT and RF switching time with a typical value given though the value may vary based on different WTRU implementation.

TABLE 12

| Cell Size (km) | RTT (us) | RF switching time (us) | ST for DL-to-UL (us) | Timing advance (us) |
| --- | --- | --- | --- | --- |
| 0.1 | 1 | 10 | 10 | 11 |
| 2 | 13 | 10 | 10 | 23 |
| 7.5 | 50 | 10 | 10 | 60 |
| 10 | 67 | 10 | 10 | 77 |
| 20 | 133 | 10 | 10 | 143 |
| 40 | 267 | 10 | 10 | 277 |
| 60 | 400 | 10 | 10 | 410 |
| 100 | 667 | 10 | 10 | 677 |

Figure 19:
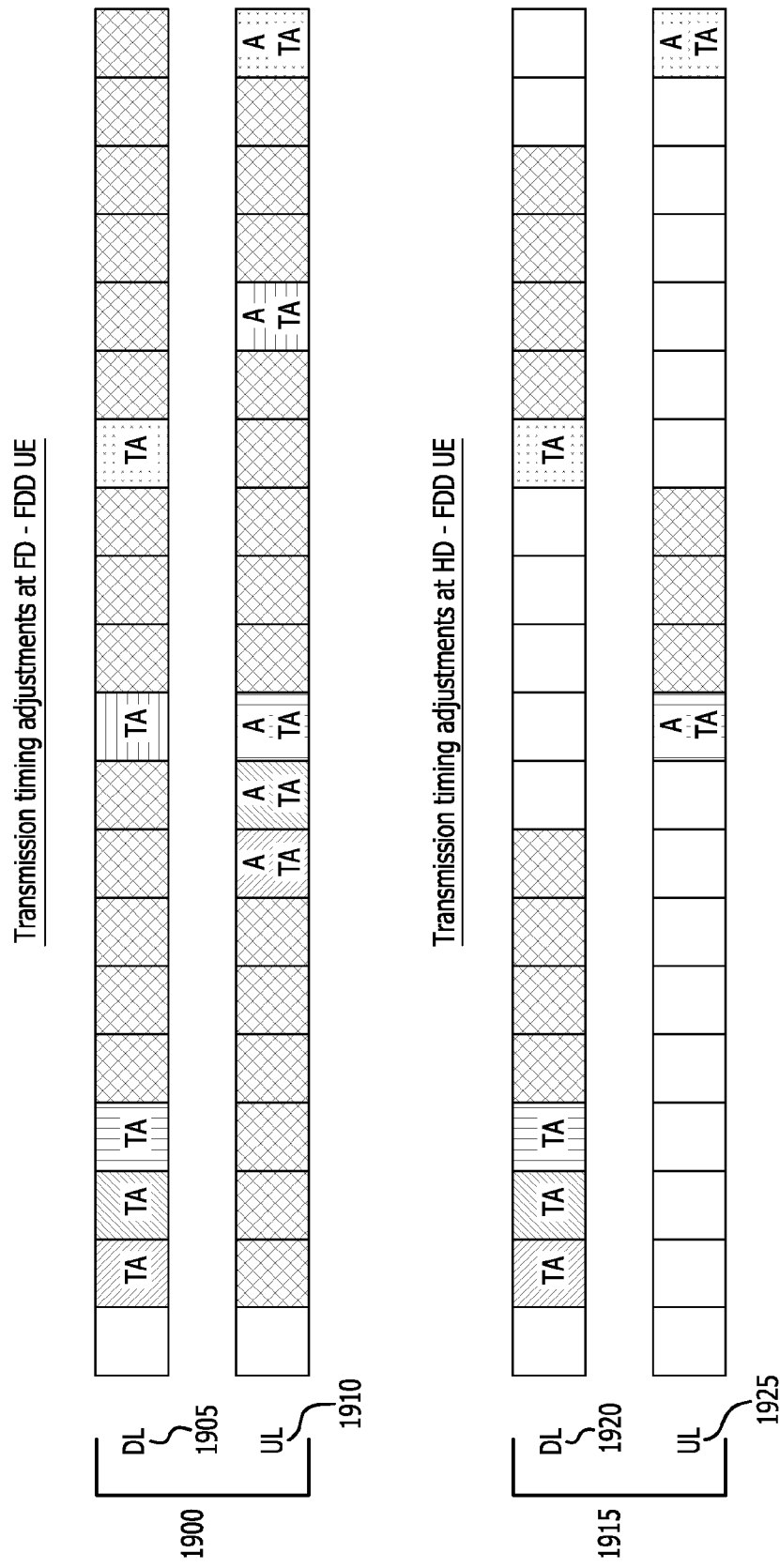
FIG. 19 is an example of the transmission timing adjustments at FD-FDD and HD-FDD WTRUs.

FIG. 19 is an example of transmission timing adjustments at an FD-FDD WTRU and an HD-FDD WTRU. An FD-FDD WTRU 1900 may simultaneously receive and transmit data without any restriction, so the reception of timing advance (TA) commands and the corresponding transmission timing adjustment at the FD-FDD WTRU may be a one-to-one mapping. Specifically, if a TA command is received on subframe n, the corresponding adjustment of the timing may apply from the beginning of subframe n+6 as shown in FIG. 19. However, for HD-FDD WTRU 1915, the WTRU may not transmit in the UL until finishing the reception of the DL. When the WTRU receives multiple TA commands before switching to UL transmission, it may be desired to specify new rules for the HD-FDD WTRU 1915 to make transmission timing adjustments. The amount of the time alignment may be determined by one of the following: the last received TA command by ignoring other received TA commands before the last TA command, the maximum or minimum of all received TA commands between previous UL transmission and the coming UL transmission, and an average of all received TA commands between previous UL transmission and the coming UL transmission.

The time to apply TA in UL maybe when the WTRU is configured in HD-FDD mode, if the WTRU receives multiple TA commands in DL, the WTRU may not apply the timing adjustments corresponding to all received multiple TA commands. The WTRU may apply the timing adjustment corresponding to the last TA command in the DL reception before the UL transmission. Specifically, if the last of multiple timing advance commands is received on subframe n, the corresponding adjustment of the timing may apply from the beginning of subframe n+6.

FIG. 19 shows an example where the WTRU may receive three TA commands in the DL before switching to UL transmission. The WTRU may ignore the first two received TA commands and may determine the amount the time alignment based on the last received TA command at subframe n. The WTRU may then apply the timing adjustment corresponding to the last received TA command at subframe (n+6).

For scheduling request (SR) transmission, when an HD-FDD WTRU has data to transmit, the WTRU may need to transmit a SR to the eNB for requesting UL resources. In a first solution, an HD-FDD WTRU may be configured by higher layers to transmit the SR on the periodic PUCCH resources. This may require avoiding SR transmissions overlapping with DL transmission. For example, the eNB may avoid DL transmission to the HD-FDD WTRU during these SR transmission instances. For example, when the WTRU needs to transmit SR, the WTRU may transmit SR after the reception of DL transmission which may be indicated by the muted one or more OFDM symbols in the DL subframe. With respect to the definition of SR transmission pattern, one example implementation may reuse the whole or subset of the table defined for FD-FDD WTRU based on DL/UL configuration. In another example, a new table may be pre-specified to define new parameters applicable for the LC-MTC WTRUs which may have more UL traffic than DL traffic. Higher layers may signal sr-ConfigIndex $I_{SR}$ from the new table to signal the SR configuration including SR transmission periodicity $SR_{PERIODICITY}$ and SR subframe offset $N_{OFFSET,SR}$.

When no dedicated PUCCH resources are configured for an HD-FDD WTRU by the higher layers, SR may use a contention based RACH procedure by one or any combination of the following methods. In a first method, the WTRU may autonomously switch back from receiving DL to transmitting UL, and then the WTRU may implicitly transmit SR by initiating contention-based RACH access.

In a second method, to overcome the potential issue of the first method that the WTRU may lose the reception of one or more last OFDM symbols muted for switching from DL to UL, when there is DL reception and UL data arrived, the WTRU may transmit SR via DL HARQ_ACK/HARQ_NACK on PUCCH instead of PRACH.

In a third solution, since the WTRU does not transmit a HARQ acknowledgement in response to reception of system information, paging messages and other broadcast traffic, the corresponding time duration for HARQ acknowledgement may be used by the WTRU to perform UL transmissions. The UL transmissions may include SR when the WTRU needs to transmit it. In one example, as MIBs and/or SIB1 are transmitted in subframes #0 and #5, subframes #4 and #9 may be predefined or implicitly signaled for the WTRU to transmit SR. In another example SIBs other than SIB1 may be read by the WTRU at subframe n, the WTRU may then transmit SR at subframe (n+4) if it needs to transmit it.

In a fourth solution, the subframes for absolute blank subframe (ABS) may be used for the WTRU to transmit SR as there may be no DL transmission and the WTRU may get the chance to transmit SR.

In HD-FDD, TTI bundling parameters, such as UL subframe patterns in a TTI bundle, TTI bundle size, number of HARQ processes, re-transmission RTT, and the like, may be a function of some system configuration parameters. For example, the system configuration parameters may be UL/DL subframe configuration (dynamic and/or static), the number of HARQ processes, the location of a TTI bundle within the frame, and the like.

A TTI bundle may consist of non-consecutive TTIs. A TTI bundle may be identified by a start subframe of the bundle and the size of the TTI bundle. A WTRU may determine the start subframe of the TTI bundle based on one or combination of the following mechanisms. The start subframe of a TTI bundle may correspond to an UL subframe or a DL subframe. The start subframe of a TTI bundle may be a function of the last TTI bundle of the same HARQ process. For example, a TTI bundle may start n subframes after the last (or first) subframe of the last TTI bundle of the same HARQ process. The parameter n may represent the number of UL subframes or the DL subframes or possibly the number of all subframes. The value of n may be a function of UL/DL subframe configuration and may be a fixed value for some or all HARQ processes. Furthermore, the intervals between TTI bundles of a single HARQ process may not be the same and may be represented by a sequence of numbers where each number may indicate the subframe distance of a specific TTI bundle to the next one. As an example, the sequence of {a1, a2, ..., ax} may represent the TTI interval between the start subframe of two adjacent TTI bundles where a1 may indicate the TTI interval of the first TTI bundle and the second TTI bundle, a2 may indicate the TTI interval of the second TTI bundle and the third TTI bundle, for example. The start subframe of a TTI bundle may be a function of the UL grant received for the initial transmission or re-transmission of its corresponding HARQ process. The start subframe of a TTI bundle may be a function of the HARQ_ACK/HARQ_NACK, for example, PHICH, received by the WTRU for the last TTI bundle of the same HARQ process.

Figure 20:
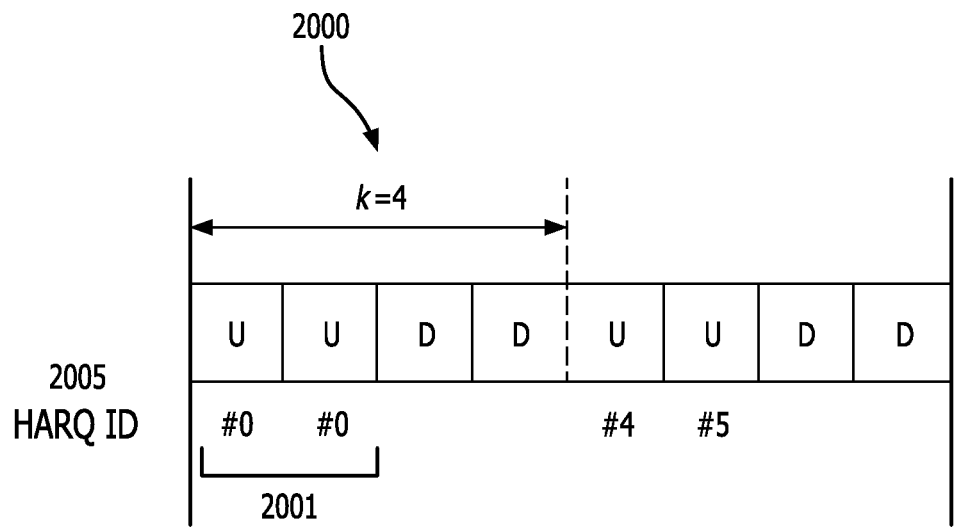
FIG. 20 is an example of TTI bundle size k=4, where k represents the total number of subframes.

FIG. 20 is an example of a TTI bundle size k=4, where k represents the total number of subframes. The size of each TTI bundle may be determined by one or combination of the following mechanisms. The size of a TTI bundle, referred to by parameter k, may indicate the number of total subframes in a TTI bundle or may indicate the number of UL subframes in a TTI bundle. The parameter k may be set to a fixed value for all or some TTI bundles. For example, consider a fixed UL/DL subframe configuration of "UUDDUUDD" 2005, where "D" refers to a DL subframe and "U" refers to an UL subframe, and k being set to 4. In FIG. 20 k is set to 4 2000 and may represent the total number of subframes. The actual number of UL subframes in the first TTI bundle of 4 subframes is equal to 2 subframes 2001.

Figure 21:
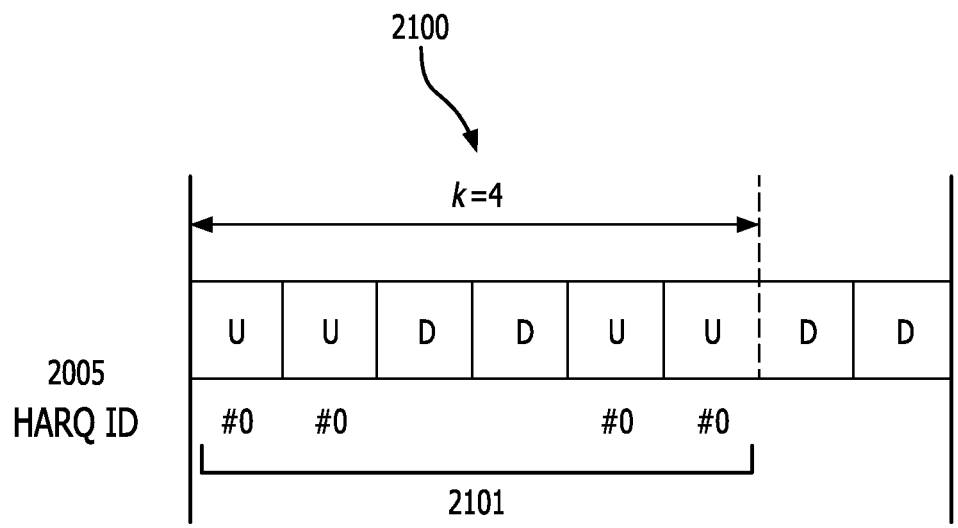
FIG. 21 is an example of TTI bundle size k equal to 4, where k represents the number of UL subframes only.

FIG. 21 is an example of a TTI bundle size k=4, where k represents the number of UL subrames only. For example, consider a fixed UL/DL subframe configuration of "UUDDUUDD" 2005, where "D" refers to a DL subframe and "U" refers to an UL subframe, and k being set to 4. On the other hand, in FIG. 21, k is again set to 4 2100 but represents the number of UL subframes. The total number of subframes in that TTI bundle is equal to 6 2101.

TTI bundle size k may be the same for TTI bundles of some or all HARQ processes. Different HARQ processes may have different TTI bundle sizes. TTI bundles in the same HARQ processes may have different sizes, for example, different values for k, depending on the UL/DL subframe configuration, frame number, the location of the TTI bundle in the frame, and the like.

In another example to identify a TTI bundle by indicating the start TTI and the bundle size, a TTI bundle may be identified by its starting TTI and its end TTI. Considering a TTI bundle, which may consist of a combination of UL and DL subframes, the WTRU may assume that consecutive redundancy versions (RVs) may be assigned to every TTI in the TTI bundle. The WTRU may only transmit in the UL subframes using the assigned RV. In this case the RVs assigned to DL subframes may be reserved and not used. Consequently, the RVs assigned to the UL subframes may not be consecutive.

Figure 22:
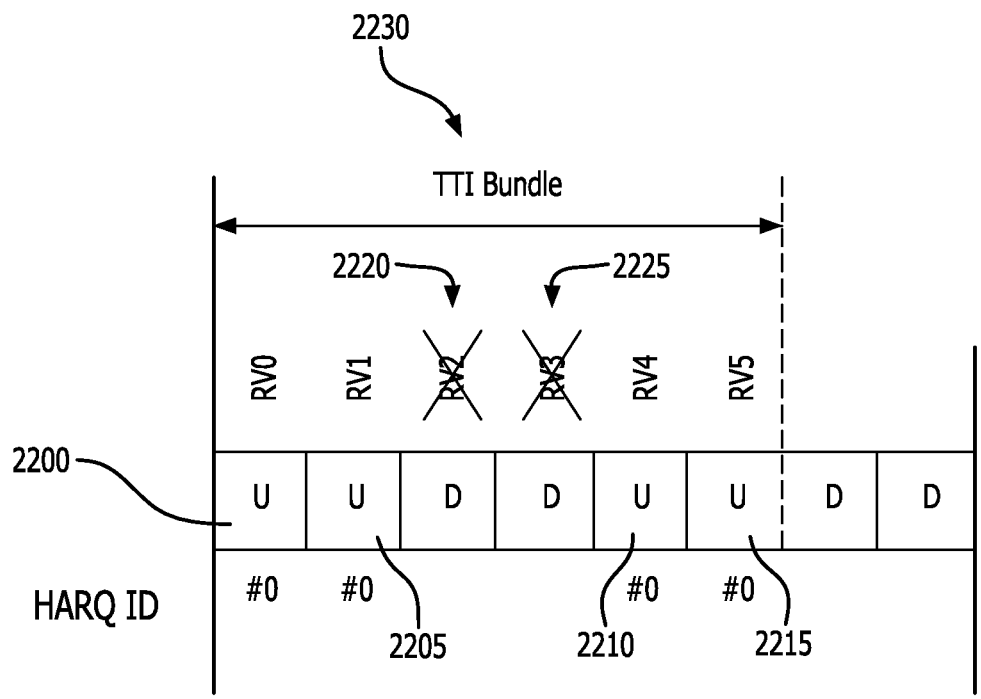
FIG. 22 is an example of RV assignment for a TTI bundle of 6 subframes where RVs are associated with every subframe in the TTI bundle.

FIG. 22 is an example of RV assignment for a TTI bundle of 6 subframes where RVs are associated with every subframe in the TTI bundle. In FIG. 22 the first 2200 and second 2205 UL subframes in the TTI bundle 2230 are transmitted using RV0 and RV1 and the third 2210 and forth 2215 UL subframes in that TTI bundle 2230 are transmitted using RV4 and RV5 (RV2 2220 and RV3 2225 are skipped and not used). In this example, the consecutive RVs may be assigned to only UL subframes, which may result in using consecutive RVs for consecutive UL transmissions.

Figure 23:
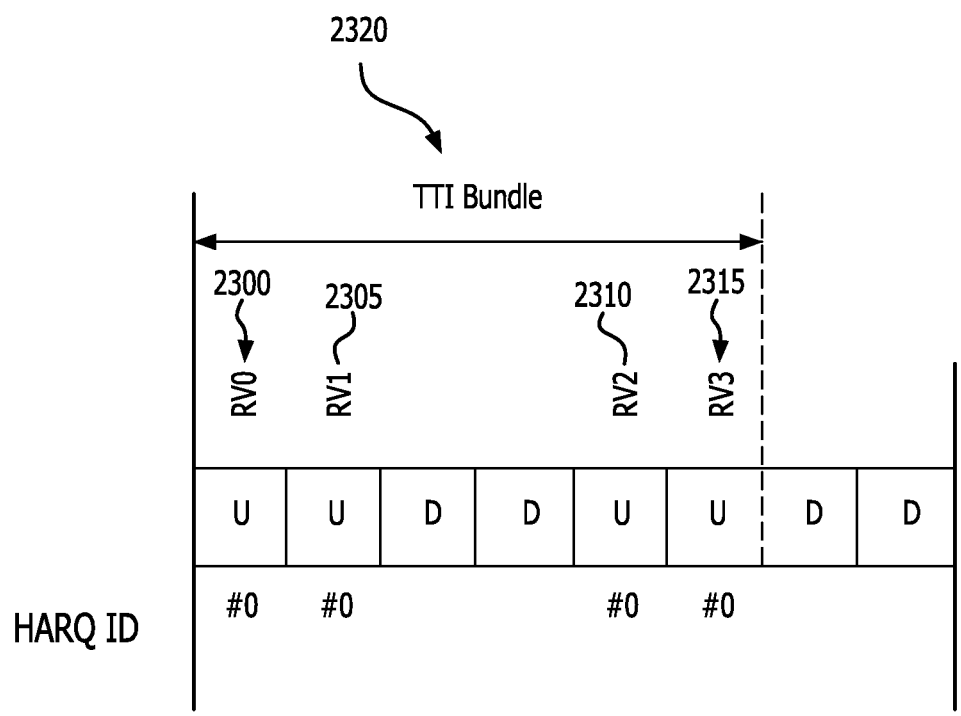
FIG. 23 is an example of RV assignment for a TTI bundle of 6 subframes where RVs are associated with only UL subframes in the TTI bundle.

FIG. 23 is an example of RV assignment for a TTI bundle of 6 subframes where RVs are associated only with UL subframes in the TTI bundle. In FIG. 23 4 UL subframes are transmitted in the TTI bundle 2320 using RV0 2300, RV1 2305, RV2 2310 and RV3 2315 (no RV is skipped in this UL transmission sequence).

Upon reception of one or more UL grants by the WTRU, the WTRU may initiate the transmission (either initial transmission or re-transmission) of one or more TTI bundle(s) in one or more HARQ process(es) according to one or combination of the following mechanisms. Upon the reception of an UL grant, for example, in subframe m, to trigger on UL transmission, for example, in subframe m+j, the WTRU may transmit data in the TTI bundle including the UL subframe m+j. Subframe m+j may correspond to the starting subframe of its corresponding TTI bundle. The parameter j may be a function of one or a combination of: one or more parameters, such as parameter m, the UL/DL subframe configuration, the intended HARQ process ID, which may be indicated implicitly from the UL grant and/or explicitly indicated within the UL grant, and the like.

The WTRU may receive two or more UL grants in the same subframe triggering the transmission in two or more HARQ processes. A single UL grant may trigger the transmission of one or more HARQ processes. In this case, the same transmission parameters, such as MCS, may be used by all triggered HARQ processes, or alternatively, that single UL grant may contain partially or completely different sets of transmission parameters for different HARQ processes. A WTRU may receive an UL grant triggering more than one TTI bundle of the same HARQ process.

The WTRU may receive an indication of HARQ_ACK/HARQ_NACK, for example, PHICH, for one or more TTI bundles according to one or a combination of the following mechanisms. The WTRU may expect to receive only one HARQ_ACK/HARQ_NACK indication, for example, PHICH, per TTI bundle. Alternatively, the WTRU may not expect HARQ_ACK/HARQ_NACK for some TTI bundles in the same HARQ process and may instead apply the HARQ_ACK/HARQ_NACK of one TTI bundle to possibly one or more previously transmitted TTI bundles as well. Furthermore, if a HARQ_NACK is received by the WTRU, the subsequent re-transmission may also be transmitted in the same number of TTIs.

Figure 24:
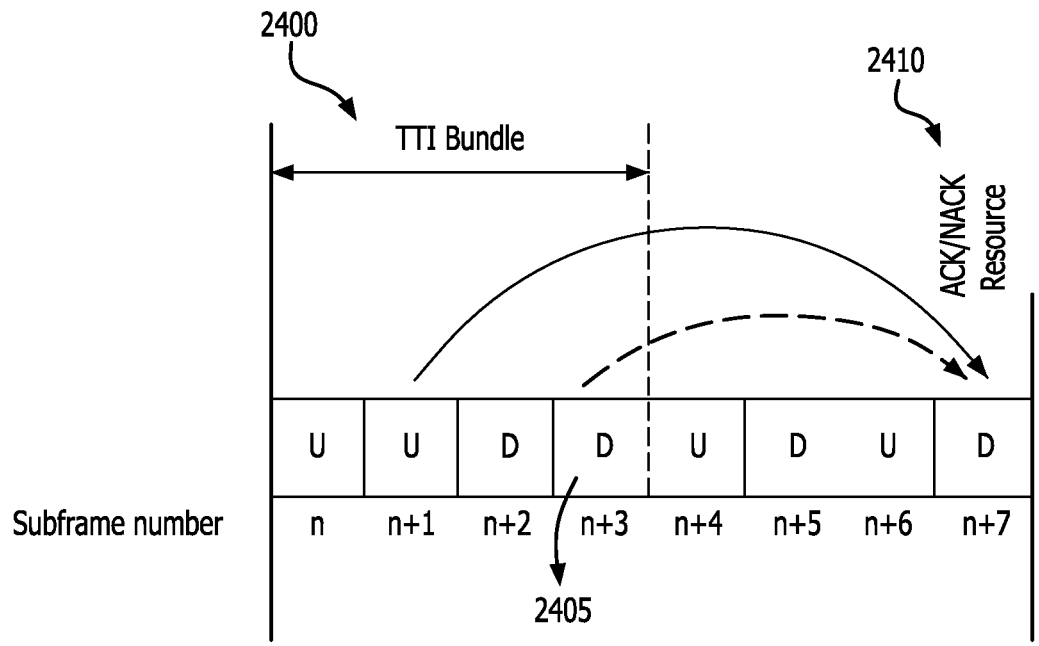
FIG. 24 is an example configuration where the TTI bundle consists of 4 TTIs and the PHICH is expected in the PHICH resource corresponding to the last subframe of the bundle although that subframe is not an UL subframe.

FIG. 24 is an example configuration where the TTI bundle consists of 4 TTIs and the PHICH is expected in the PHICH resource corresponding to the last subframe of the bundle although that subframe is not an UL subframe. The WTRU may receive an HARQ_ACK/HARQ_NACK 2410 indication of the TTI bundle 2400, by expecting a PHICH in a PHICH resource corresponding to the last subframe 2405 of the TTI bundle 2400 following the PHICH rules, regardless if that subframe is configured as a DL subframe or an UL subframe. As illustrated in FIG. 24 the TTI bundle 2400 consists of 4 total subframes and the last subframe 2405 of the TTI bundle 2400, for example, subframe n+3 2405, is not an UL subframe. However, the WTRU may expect the PHICH in subframe n+7 according to the PHICH timing of subframe n+4 based on rules.

Figure 25:
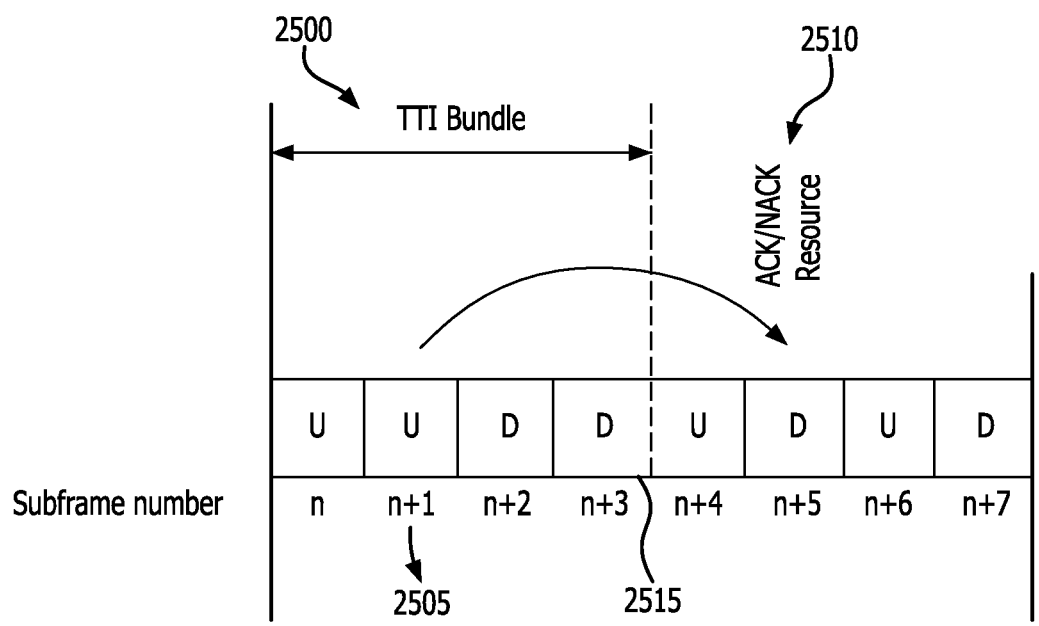
FIG. 25 is an example configuration where the TTI bundle consists of 4 TTIs and the PHICH is expected in the PHICH resource corresponding to the last UL subframe of the bundle.

FIG. 25 is an example configuration where the TTI bundle consists of 4 TTIs and the PHICH is expected in the PHICH resource corresponding to the last UL subframe of the bundle. The WTRU may receive an indication of the ACK/NACK 2510 of the TTI bundle 2500, by expecting a PHICH in a PHICH resource corresponding to the last UL subframe 2505 of the TTI bundle 2500. As illustrated in FIG. 25 the subframe n+1 2505 is not the last subframe 2515 of the TTI bundle 2500 but it is the last UL subframe 2505 of the TTI bundle 2500. The WTRU may expect the PHICH in subframe n+6 corresponding to this subframe according to the PHICH rules.

A WTRU may not expect PHICH for one or more of its HARQ processes. A WTRU may interpret an expected HARQ_ACK/HARQ_NACK for a specific TTI bundle as an indication of the HARQ_ACK/HARQ_NACK for one or more other TTI bundles of other HARQ processes as well. In this case, the aforementioned bundled HARQ_ACK/HARQ_NACK, for example, the PHICH representing the HARQ_ACK/HARQ_NACK of possibly multiple HARQ processes and/or multi TTI bundles, may be derived as a logical AND (or possibly a logical OR) of the corresponding HARQ_ACK/HARQ_NACK of those HARQ processes and/or TTI bundles. A WTRU may not expect PHICH for one or more of its HARQ processes and instead it may keep re-transmission until it receives a new UL grant with NDI field toggled.

Figure 26:
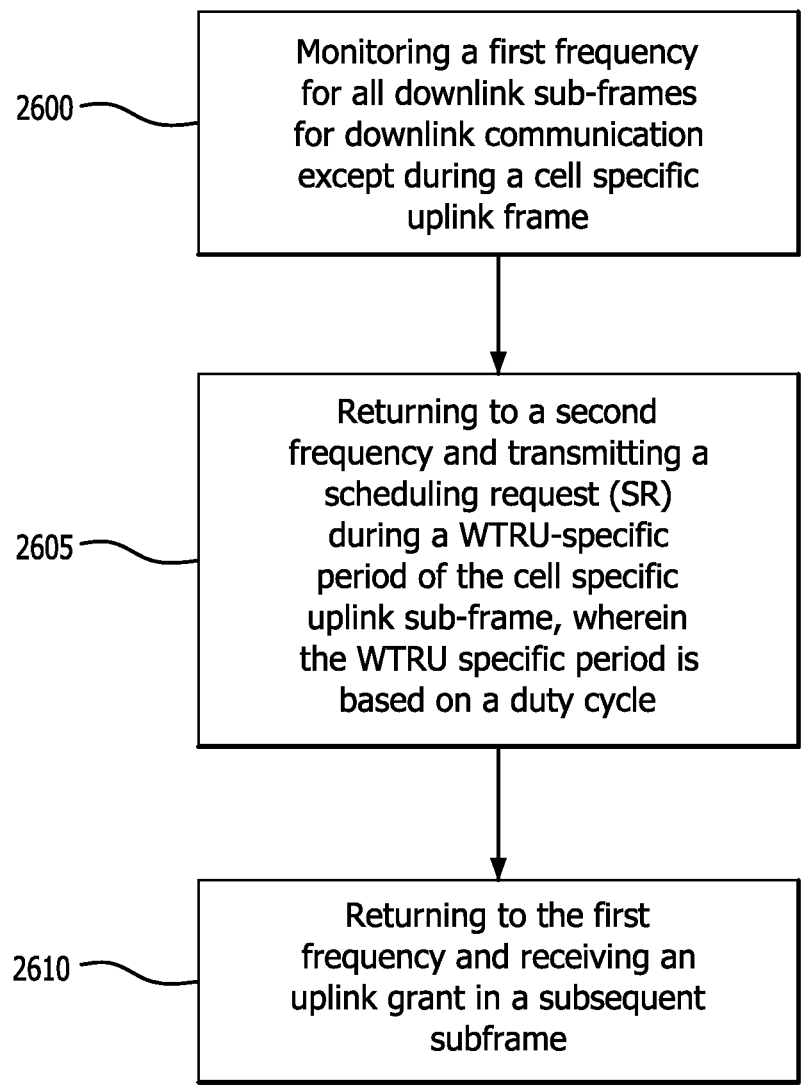
FIG. 26 is an example method of HD-FDD in a WTRU.

FIG. 26 is an example method for FD-HDD operation in a WTRU. The WTRU may monitor a first frequency 2600 for all downlink sub-frames for downlink communication except during a cell specific uplink frame. The WTRU may retune to a second frequency 2605 and transmitting a scheduling request (SR) during a WTRU specific period of the cell specific uplink frame, wherein the WTRU specific period is based on a duty cycle. The WTRU may retune to the first frequency 2610 and receiving an uplink grant in a subsequent sub-frame.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method, implemented in a wireless transmit/receive unit (WTRU), for supporting a half-duplex (HD) frequency division duplex (FDD) (HD-FDD) operation mode in a network operating in a FDD operation mode, the method comprising:

transmitting an indication of the HD-FDD operation mode to a base station of the network;

monitoring a first frequency for downlink transmissions;

receiving, via the first frequency, a first downlink subframe including an uplink grant;

determining, based on a timing of the uplink grant, a second downlink subframe that immediately precedes an uplink subframe allocated by the uplink grant;

ceasing any of monitoring and reception on the first frequency during the second downlink subframe;

retuning to a second frequency, wherein the retuning to the second frequency takes place within a first time period starting from the cessation and ending prior to the uplink subframe;

transmitting during the uplink subframe via the second frequency;

subsequent to transmitting during the uplink subframe, retuning to the first frequency, wherein the retuning to the first frequency takes place within a second time period corresponding to a third downlink subframe that immediately follows cessation of uplink transmissions; and monitoring and/or receiving during a fourth downlink subframe following the third downlink subframe via the first frequency.

2. The method of claim 1, wherein the first time period is specific to the WTRU.

3. The method of claim 1, wherein the second time period is specific to the WTRU.

4. The method of claim 1, wherein the first time period is based on a time needed for the WTRU to retune from receiving via the first frequency to transmitting via the second frequency.

5. The method of claim 1, wherein the second time period is based on a time needed for the WTRU to retune from transmitting via the second frequency to receiving via the first frequency.

6. The method of claim 1, wherein the second time period is based on a class of the WTRU.

7. The method of claim 1, wherein the third downlink subframe immediately follows the uplink subframe.

8. The method of claim 1, further comprising:
configuring a transceiver of the WTRU to cease monitoring and reception on the first frequency during the second downlink subframe.

9. The method of claim 1, wherein the network operates in a full-duplex (FD) FDD (FD-FDD) operation mode with respect to another WTRU.

10. A wireless transmit/receive unit (WTRU) configured to support a half-duplex (HD) frequency division duplex (FDD) (HD-FDD) operation mode in a network operating in a FDD operation mode, the WTRU comprising:

a transceiver configured to transmit an indication of the HD-FDD operation mode to a base station of the network;

a processor in combination with the transceiver configured to monitor a first frequency for downlink transmissions;

the transceiver configured to receive, via the first frequency, a first downlink subframe including an uplink grant;

the processor configured to determine, based on a timing of the uplink grant, a second downlink subframe that immediately precedes an uplink subframe allocated by the uplink grant;

the processor in combination with the transceiver configured to cease any of monitoring and reception on the first frequency during the second downlink subframe;

the transceiver configured to retune to a second frequency, wherein the retuning to the second frequency takes place within a first time period starting from the cessation and ending prior to the uplink subframe;

the transceiver configured to transmit during the uplink subframe via the second frequency;

the transceiver configured to retune to the first frequency subsequent to transmitting during the uplink subframe, wherein the retuning to the first frequency takes place within a second time period corresponding to a third downlink subframe that immediately follows cessation of uplink transmissions; and the transceiver configured to monitor and/or receive during a fourth downlink subframe following the third downlink subframe via the first frequency.

11. The WTRU of claim 10, wherein the first time period is specific to the WTRU.

12. The WTRU of claim 10, wherein the second time period is specific to the WTRU.

13. The WTRU of claim 10, wherein the first time period is based on a time needed for the WTRU to retune from receiving via the first frequency to transmitting via the second frequency.

14. The WTRU of claim 10, wherein the second time period is based on a time needed for the WTRU to retune from transmitting via the second frequency to receiving via the first frequency.

15. The WTRU of claim 10, wherein the second time period is based on a class of the WTRU.

16. The WTRU of claim 10, wherein the third downlink subframe immediately follows the uplink subframe.

17. The WTRU of claim 10, wherein the network operates in a full-duplex (FD) FDD (FD-FDD) operation mode with respect to another WTRU.

* * * * *

UNITED STATES PATENT AND TRADEMARK OFFICE
CERTIFICATE OF CORRECTION

Page 1 of 2

PATENT NO. : 9,515,696 B2
APPLICATION NO. : 13/836812
DATED : December 6, 2016
INVENTOR(S) : Moon-il Lee et al.

It is certified that error appears in the above-identified patent and that said Letters Patent is hereby corrected as shown below:

On the Title Page

In item (56), first column, under PUBLICATIONS, "Half Duplex FDD Operation in LTE, 3GPP, TSF-RAN WG1 Meeting #51bis.*" should be --"Half Duplex FDD Operation in LTE," 3GPP Tdoc R1-080614, 3GPP TSG-RAN WG1 Meeting #51bis, Seville, Spain, Jan 14-18, 2008, 2 pages.*--

In the figure, at reference no. 2600, "sub-frames" should be --subframes--

In item (56), at page 2, second column, under PUBLICATIONS,
"3rd Generation Partnership Project Technical Specification; LTE; Evolved Universal Terrestrial Radio Access (E-UTRA); Multiplexing and Channel Coding (Release 10)", 3GPP TS 36.212 V10.1.0, Apr. 2011, 76 pages." should be --"3rd Generation Partnership Project; Technical Specification Group Radio Access Network; Evolved Universal Terrestrial Radio Access (E-UTRA); Multiplexing and Channel Coding (Release 10)", 3GPP TS 36.212 V10.1.0, Mar. 2011, 76 pages.--
"3rd Generation Partnership Project Technical Specification; LTE; Evolved Universal Terrestrial Radio Access (E-UTRA); Physical Layer Procedures (Release 10)", 3GPP TS 36.211 V10.1.0, Apr. 2011, 103 pages." should be --"3rd Generation Partnership Project; Technical Specification Group Radio Access Network; Evolved Universal Terrestrial Radio Access (E-UTRA); Physical Channels and Modulation (Release 10)", 3GPP TS 36.211 V10.1.0, Mar. 2011, 103 pages.--
"3rd Generation Partnership Project Technical Specification; LTE; Evolved Universal Terrestrial Radio Access (E-UTRA); Physical Layer Procedures (Release 10)", 3GPP TS 36.213 V10.1.0, Apr. 2011, 115 pages." should be --"3rd Generation Partnership Project; Technical Specification Group Radio Access Network; Evolved Universal Terrestrial Radio Access (E-UTRA); Physical Layer Procedures (Release 10)", 3GPP TS 36.213 V10.1.0, Mar. 2011, 115 pages.--

In the Drawings

At FIG. 26, reference no. 2600, "sub-frames" should be --subframes--

Signed and Sealed this
Ninth Day of October, 2018

Andrei Iancu
*Director of the United States Patent and Trademark Office*

In the Specification

At Column 15, Line 5, "$^N PHICh^{group}$" should be --$^N PHICH^{group}$--

At Column 27, Line 65, "need" should be --needed--

At Column 30, Line 43, "subrames" should be --subframes--

At Column 31, Line 2, "subrames" should be --subframes--

At Column 32, Line 33, "sub-frames" should be --subframes--

In the Claims

In Claim 1, at Column 33, Line 11, "returning" should be --retuning--